US011914963B2

(12) United States Patent
Jain et al.

(10) Patent No.: US 11,914,963 B2
(45) Date of Patent: Feb. 27, 2024

(54) SYSTEMS AND METHODS FOR DETERMINING AND USING SEMANTIC RELATEDNESS TO CLASSIFY SEGMENTS OF TEXT

(71) Applicant: Theta Lake, Inc., Santa Barbara, CA (US)

(72) Inventors: Rohit Jain, Ventura, CA (US); Devin H. Redmond, Encinitas, CA (US); Richard B. Sutton, San Mateo, CA (US); Alon Albalak, Goleta, CA (US); Sharon Hüffner, Berlin (DE)

(73) Assignee: THETA LAKE, INC., Santa Barbara, CA (US)

( * ) Notice: Subject to any disclaimer, the term of this patent is extended or adjusted under 35 U.S.C. 154(b) by 131 days.

(21) Appl. No.: 17/192,351

(22) Filed: Mar. 4, 2021

(65) Prior Publication Data
US 2021/0279420 A1 Sep. 9, 2021

Related U.S. Application Data

(60) Provisional application No. 62/985,176, filed on Mar. 4, 2020.

(51) Int. Cl.
| | |
|---|---|
| G06F 40/279 | (2020.01) |
| G06F 17/16 | (2006.01) |
| G06F 40/216 | (2020.01) |
| G06F 40/30 | (2020.01) |
| G06F 40/35 | (2020.01) |
| G06V 30/414 | (2022.01) |
| G06V 30/40 | (2022.01) |

(52) U.S. Cl.
CPC .............. *G06F 40/30* (2020.01); *G06F 17/16* (2013.01); *G06F 40/216* (2020.01); *G06V 30/414* (2022.01); *G06V 30/40* (2022.01)

(58) Field of Classification Search
CPC ...... G06F 17/16; G06F 40/237; G06F 40/279; G06F 40/284; G06F 40/289; G06F 40/30; G06F 40/35; G06N 20/00
USPC ..................................... 704/1, 9; 706/12, 20
See application file for complete search history.

(56) References Cited

U.S. PATENT DOCUMENTS 6,970,881 B1 * 11/2005 Mohan .................... G06F 16/36
9,514,113 B1 * 12/2016 Shaw ..................... G06F 40/169
(Continued)

OTHER PUBLICATIONS

Zhelezniak, Vitalii et al., "Don't Settle for Average, Go for the Max: Fuzzy Sets and Max-Pooled Word Vectors", ICLS 2019 Conference, arXiv:1904.13264v1, Apr. 30, 2019, 17 pgs.

*Primary Examiner* — Martin Lerner
(74) *Attorney, Agent, or Firm* — Sprinkle IP Law Group

(57) ABSTRACT

Systems and methods for detecting and using semantic relatedness to classify segments of digital text are disclosed. More particularly, embodiments determine the semantic relatedness of segments of text to abstract categories where the abstract categories are not defined by a single word or semantic concept. Detecting semantic relatedness includes analyzing text, embedding the text, and determining semantic relatedness to a set of concepts for a category where each concept may include a set of words/phrases embedded in a similar fashion. The text embedding can be projected onto each concept embedding and reduced to a score representing semantic relatedness. The text is classified based on the semantic relatedness.

23 Claims, 11 Drawing Sheets

(56) References Cited

U.S. PATENT DOCUMENTS

| | | | |
|---|---|---|---|
| 11,461,668 B1* | 10/2022 | Mohandas | G06F 40/30 |
| 2006/0242147 A1* | 10/2006 | Gehrking | G06F 16/353 |
| 2008/0288516 A1* | 11/2008 | Hadfield | G06F 16/3335 |
| 2011/0112824 A1* | 5/2011 | Sayers | G06F 40/237 |
| | | | 704/9 |
| 2013/0185307 A1* | 7/2013 | El-Yaniv | G06F 40/30 |
| | | | 707/748 |
| 2015/0039344 A1* | 2/2015 | Kinney | G16H 10/60 |
| | | | 705/3 |
| 2015/0120738 A1* | 4/2015 | Srinivasan | G06F 16/285 |
| | | | 707/739 |
| 2016/0217343 A1* | 7/2016 | Hoffman | G06F 40/30 |
| 2018/0089152 A1* | 3/2018 | Maksak | G06F 40/30 |
| 2018/0101773 A1* | 4/2018 | Yu | G06F 40/00 |
| 2018/0217980 A1* | 8/2018 | Baron-Palucka | G06F 40/30 |
| 2020/0226126 A1* | 7/2020 | Zou | G06F 40/289 |
| 2020/0293720 A1* | 9/2020 | Tu | G06F 40/289 |
| 2020/0327198 A1* | 10/2020 | Ding | G06F 40/30 |
| 2020/0387570 A1* | 12/2020 | Biswas | G06F 40/30 |
| 2021/0027141 A1* | 1/2021 | MacAvaney | G06F 40/279 |
| 2021/0056171 A1* | 2/2021 | Bull | G06F 40/279 |
| 2021/0073307 A1* | 3/2021 | Lu | G06F 40/53 |
| 2021/0200515 A1* | 7/2021 | Rayapati | G06F 40/30 |
| 2021/0272013 A1* | 9/2021 | Szanto | G06F 40/30 |

* cited by examiner

FIG. 6

SYSTEMS AND METHODS FOR DETERMINING AND USING SEMANTIC RELATEDNESS TO CLASSIFY SEGMENTS OF TEXT

RELATED APPLICATION(S)

This application claims a benefit of priority under 35 U.S.C. § 119(e) from U.S. Provisional Patent Application No. 62/985,176, filed on Mar. 4, 2020 entitled "METHOD TO DETERMINE SEMANTIC RELATEDNESS OF SEGMENTS OF TEXT TO ABSTRACT CATEGORIES," the entire contents of which are hereby fully incorporated by reference herein for all purposes.

TECHNICAL FIELD

This disclosure relates generally to systems and methods classifying text. More particularly, this disclosure relates to embodiments of a concept-based approach to determine the semantic relatedness of segments of text to abstract categories to label the text.

BACKGROUND

The use of dynamic online communications platforms like collaboration, chat, and email have introduced regulatory, privacy, and cybersecurity risks for organizations of all sizes. In order to protect sensitive systems and information, meet regulatory obligations, and supervise communications taking place on dynamic communications platforms, many organizations are using software to detect potential risks and efficiently analyze the results. As part of determining which data might constitute a potential risk, some software tools classify data from communications platforms into categories related to regulatory, privacy, cybersecurity, and other risks.

While text classification into categories is performed using many methods, the existing implementations typically focus on classifying all of the text as a whole and classify text to simple categories like positive/negative as in sentiment analysis or some variant thereof. These categories tend to be specific topics of limited semantic scope or keywords. The techniques employed to classify text typically fall into one of the following categories: evaluating the similarity of an entire document to an entire document already categorized; extracting keywords from a document or set of documents and classifying based on the extracted keywords; summarizing a document into a set of predefined keywords; mapping documents to predefined ontological categories; or creating ontologies from documents. In all these cases, the categories are simple, and the analysis is at the document or paragraph level.

In some contexts, it is desirable to classify sections of text based on semantically broad categories like "risky behavior" or "insurance suitability" or "Dodd-Frank related" where these categories cannot be defined by a single word or a single semantic concept. Therefore, improved mechanisms for classifying text are desired.

SUMMARY

Attention is thus directed to the system and methods disclosed herein. Embodiments described herein include classifiers that classify segments of text based on semantic relatedness to abstract categories. The abstract categories are divided into concepts and each concept includes a set of words or phrases that are used by the classifier in determining semantic relatedness to the abstract categories.

In general, an abstract category represents a level of classification that cannot be represented by a single word or phrase or semantic concept. Indeed, an abstract category may encompass concepts that are semantically unrelated. For example, an organization may wish to label text as representing "risky behavior." Unlike binary labels of "positive", "negative," "risky behavior" is somewhat fuzzy as it may represent a wide variety of otherwise unrelated behavior and there may be words or phrases that represent risky behavior in some contexts, but not others. In some embodiments then, the abstract categories are divided into semantic concepts where each semantic concept includes a collection of semantically related words or phrases.

The hierarchy of abstract categories, concepts and words and phrases provides an advantageous structure for the classifiers. The classifiers can use the words and phrases of the concepts to determine the semantic relatedness of a set of text to the concepts and map the concept relatedness to category relatedness. The use of concepts can allow the constituent semantic concepts to be independently tuned by adding, removing, or updating words and phrases.

Classifiers described herein can determine semantic relatedness of relatively small segments of text, for example on the phrase or sentence level. Thus, embodiments can provide an advantage by localizing semantic relatedness at the phrase or sentence level and map relatedness to abstract categories that include one or more concepts where each concept may require more than one word or phrase for a semantic definition. As such, embodiments can label specific portions of documents, audio transcripts, video transcripts, chat transcripts or other text as representing categories of interest (e.g., "risky behavior").

Moreover, determinations of semantic relatedness can be performed based on embeddings that account for context. Consequently, even if a set of text does not exactly match the words and phrases for a concept, the classifier can still detect that the text relates to the same concept. In some embodiments, the classifier's capability to account for variations or context, in conjunction with its ability to localize semantic relatedness at the phrase or sentence level facilitates the ability of a classifier to begin classifying based on a relatively small seed set of words and phrases. For example, a semantic concept can be seeded (e.g., by a user with domain knowledge) with a small set of words and phrases. The classifier may be run over a set of data (e.g., unlabeled data) to identify additional phrases that have a high semantic relatedness to the concept. These phrases can be added to the semantic concept. Thus, a diverse set of words or phrases can be determined from a relatively small seed set through ongoing processing to label text segments without requiring a large set of labeled training data.

One embodiment includes a system for classification. Other embodiments may include related computer-readable media and methods. The system includes a processor, a memory for storing a category, and a non-transitory, computer-readable medium storing a set of instructions that are executable by the processor. The category comprises a collection of semantic concepts, each semantic concept comprising a collection of semantically related words, subwords, or phrases.

The set of instructions includes instructions for: receiving a digital text to be evaluated against the category; converting the digital text into a plurality of embedded text segments using an embedding; converting the category into an embedded category comprising a plurality of embedded semantic concepts, said converting the category into the embedded category comprising embedding the collection of semantic concepts using the embedding; determining a relatedness score for each of the plurality of embedded text segments with respect to each of the plurality of embedded semantic concepts to determine a plurality of relatedness scores; determining that the digital text is related to the category based on the plurality of relatedness scores; based on a determination that the digital text is related to the category; annotating the digital text with the category; and storing the annotated digital text.

According to one embodiment, converting the category into the embedded category comprises, for each semantic concept in the collection of semantic concepts of the category, generating a word vector for each word or sub-word and a vector array for each phrase in the collection of semantically related words, sub-words, or phrases of the semantic concept and aggregating the word vectors and arrays generated for the semantic concept to generate a concept matrix for the semantic concept, wherein the embedded category comprises a plurality of concept matrices.

According to one embodiment, converting the digital text into the plurality of embedded text segments using the embedding, comprises: embedding the digital text using the embedding to convert each word or sub-word in the digital text into a corresponding vector to generate a plurality of word vectors; after embedding the digital text, aggregating subsets of word vectors from the plurality of word vectors to generate a plurality of embedded text matrices, each of the plurality of embedded text matrices representing a different segment of the digital text.

In another embodiment, converting the digital text into the plurality of embedded text segments using the embedding, comprises for each of a plurality of segments selected from the digital text, converting each of a plurality of words or sub-words into a corresponding vector to generate a plurality of word vectors and aggregating the plurality of word vectors into an embedded text matrix representing that segment. The plurality of segments is determined by applying a sliding window to the digital text.

In accordance with one embodiment, determining the relatedness score for each of the plurality of embedded text segments with respect to each of the plurality of embedded semantic concepts to determine the plurality of relatedness scores comprises projecting an embedded text matrix onto a concept matrix representing a semantic concept.

Projecting the embedded text matrix on the concept matrix may comprise: combining the embedded text matrix with the concept matrix to determine a universe; multiplying the universe by the embedded text matrix to determine a first additional matrix; multiplying the universe by the concept matrix to determine a second additional matrix; converting the first additional matrix to a first vector and the second additional matrix to a second vector; and determining a degree of relatedness of the embedded text matrix to the concept matrix by using a vector distance metric to reduce the first vector and the second vector to a number representing the degree of relatedness.

As discussed above, the set of text and the semantic concepts may be embedded according to an embedding. Various embedding techniques may be used including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification.

In some embodiments, one or more of the embeddings are sub-word embeddings. The use of sub-word embeddings can reduce or remove pre-processing techniques such as tokenization or stemming, and thus simplify the text processing pipeline. In addition, sub-word embeddings are more robust to errors in the parts of words which are relevant to the processing of text derived from transcriptions or OCR. Some embodiments also use contextual embeddings to further refine the semantic embedding of any sub-word or full word based on the surrounding context words.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 6 is a diagrammatic representation of a user interface displaying text including a classified segment.

DETAILED DESCRIPTION

Figure 1:
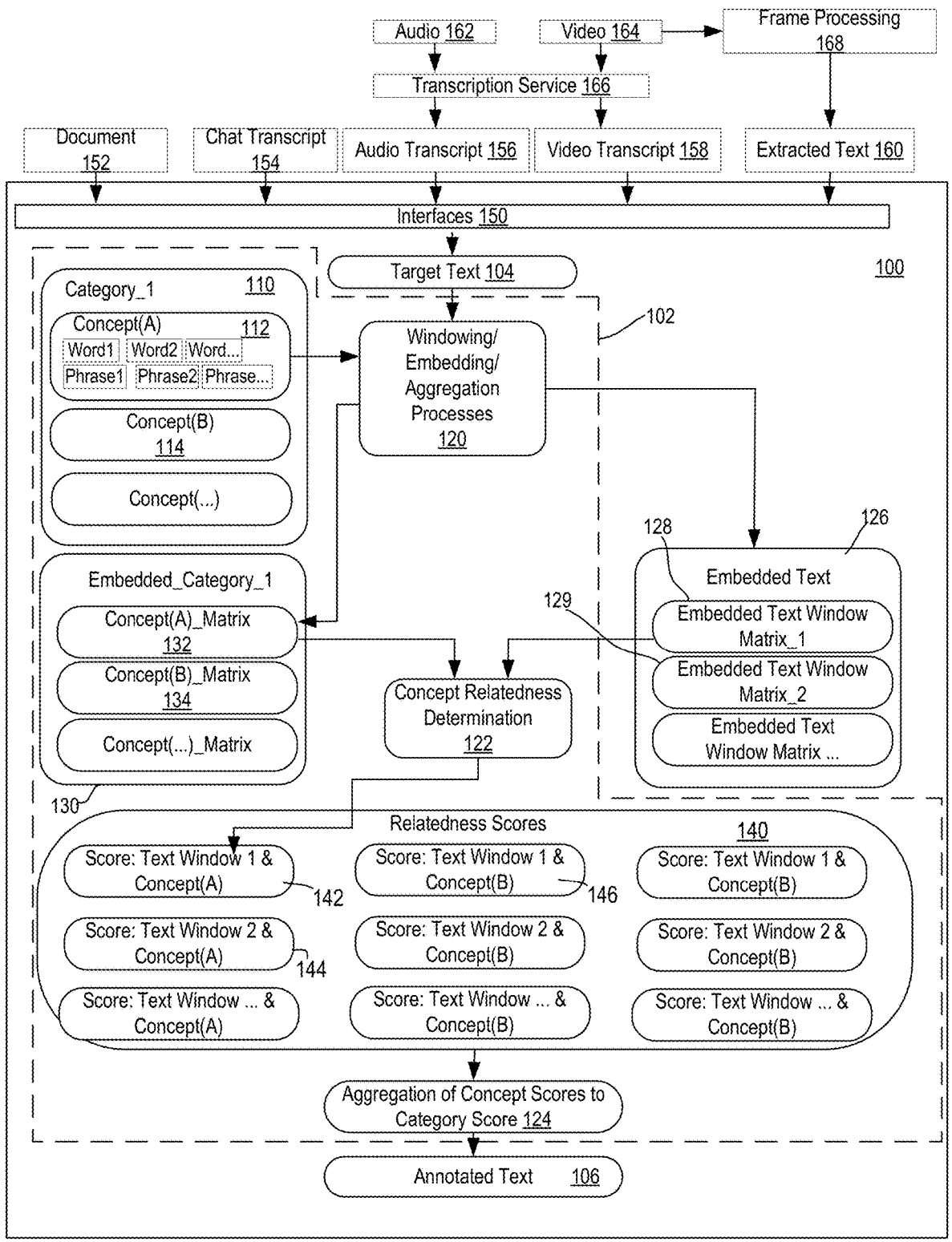
FIG. 1 is a diagrammatic representation of one embodiment of a system for determining and using semantic relatedness to classify segments of text.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. As mentioned, it may be desirable to classify sections of text based on semantically broad categories, such as "risky behavior". One approach to this type of problem uses rule-based matching of one or more sets of words or phrases to pieces of text. The rules may be defined to instill some robustness to errors in transcription and optical character recognition (OCR) as well as errors in semantic matching. However, this type of approach only generalizes to variations that are explicitly codified in the rulesets.

The shortcomings of text classification techniques used in compliance, privacy, security, risk and other review processes become clearer when the wide variety of data subject to analysis is considered. With the recent explosion of video marketing, video conference, video chat, and conference calls, an increasing amount of data potentially subject to compliance rules and other standards of conduct, privacy, or security are contained in audio and video files. Text generated from speech, however, is typically less structured and more colloquial than in written documents and may contain errors introduced by the transcription process. The inability of a purely rules-based matching approach to adequately account for variations not explicitly coded in a tool's ruleset may lead to the tool failing to properly classify text and, for example, missing behavior that should be surfaced for oversight.

While machine learning classifiers can be used to classify text into a variety of categories, machine learning classifiers typically face a bootstrapping problem. More particularly, machine learning techniques typically require a large amount of labeled training data to properly train a machine learning model for particular types of data and categories. It may be difficult, impossible, or costly in terms of time and money to produce an acceptable training set for new categories of interest or domains.

What is desired, therefore, are systems and methods to more accurately classify text based on semantically broad categories, which may be used for a variety of applications such as identifying risks for digital communication review, oversight, compliance, law enforcement, and privacy assurance. Further, what is desired are systems and methods that can classify text into abstract categories without requiring a large amount of training data to train classifiers.

To those ends, among others, attention is now directed to systems and methods for determining and using semantic relatedness to classify segments of text. Embodiments described herein relate generally to systems, methods, and computer readable media for using machine learning based techniques to classify segments of text that are semantically related to abstract categories. For example, one embodiment includes detecting the semantic relatedness of segments of text to detect sections of speech, screen content, chat content, or document text within digital audio, video, chat, document files or other digital content that are potentially semantically related to one or more abstract categories. In general, the categories are abstract enough that matching to a single word or phrase is not sufficient to capture their semantic range.

Each abstract category may have an identity to distinguish it from other abstract categories in the system, a description, and a defined logical collection of concepts. Each concept may have an identity to distinguish it from other concepts in the category (or the system), a description and a defined logical collection of words or phrases. In some embodiments, each concept represents a different semantic concept and includes a collection of semantically related words of phrases related to that concept.

The words or phrases for a concept may be provided in a number of ways. In some embodiments, the words or phrases of a concept are determined using machine learning, for example by providing a machine learning model with a corpus of labelled text for the machine learning model to determine the sets of words or phrases that correspond to concepts in a category. In addition, or in the alternative, the sets of words or phrases may be provided, augmented, or edited by a user.

Each concept may be seeded with a relatively small collection of words or phrases. For example, each concept may be seeded with a dozen or less words or sentences. A concept can be run against a large number of text segments to determine the text segments that are semantically related to the concept. Thus, automated classification of text as related to categories or subcategories can begin without requiring a large set of training data labeled with the categories or subcategories.

If a segment is marked as semantically related to the concept, the text segment can be added to the collection of words or phrases of the concept (in some cases based on review of the text segment to confirm that it is actually related to the concept and is different enough from the other words and phrases in the concept). Thus, a diverse set of labels for classification can be determined from a relatively small seed set through ongoing processing to label text segments. If a segment is marked as semantically related to a concept, but on review it is determined that the segment is not actually related to the concept, it may be determined which word or phrase of the concept caused the segment to be identified and that word or phrase removed from the concept. The words or phrases for a concept can thus be further refined.

According to one embodiment, detecting semantic relatedness comprises analyzing text, embedding the text, and determining the semantic relatedness to the concept of a category, where each concept includes a set of words/phrases embedded in a similar fashion. The text embedding can be projected onto each concept embedding and reduced to a number score representing semantic relatedness, which can then be compared to a threshold or otherwise analyzed to determine meaningful semantic relatedness.

More particularly, the semantic relatedness of a piece of text to a collection of words or phrases, such as a concept, can be determined using embeddings to transform the set of text and the collection of words and phrases for semantic concepts into numeric representations. Any number of word embeddings (e.g., full word embeddings or sub-word embeddings), or other types of embeddings, such as contextual or phrase embeddings, may be used. Multiple embeddings may be combined in many ways ranging from simple concatenation to complex non-linear transformations. In some embodiments, a determination of semantic relationship can be combined with rules-based matching. The rules-based match can be used to detect matches between words and phrases in a segment of text and the words and phrases of a concept and embeddings can be used to detect semantic relatedness of the segment of text to the concept. The embeddings allow a system to generalize beyond patterns defined by the rules while the rule-based matching ensures that that the system does not miss detection of those specific patterns defined in the rules.

In some embodiments, one or more of the embeddings are sub-word embeddings. The use of sub-word embeddings can reduce or remove pre-processing techniques such as tokenization or stemming, and thus simplify the text processing pipeline. In addition, sub-word embeddings are more robust to errors in the parts of words which are relevant to the processing of text derived from transcriptions or OCR. Some embodiments also use contextual embeddings to further refine the semantic embedding of any sub-word or full word based on the surrounding context words.

Full word embeddings, sub-word embeddings, context embeddings or other embeddings may be pre-trained using deep neural networks with large amounts of data. Such embeddings provide the advantage of generalization without explicit specification. Other machine learning techniques may also be used. As will be appreciated, there are a number of commercially available and open-source embeddings pre-trained on large amounts of data. Some embodiments can use techniques of transfer learning to leverage such pre-trained embeddings. In some embodiments, the transfer learning can include fine tuning to a specific application domain. In other embodiments, transfer learning is performed without fine tuning.

Embodiments described herein may be used to analyze text from a variety of sources. A segment of text may correspond, for example, to a section of a video or audio or part of a document or chat transcript, or a portion of other digital media from which text can be extracted. Embodiments may provide, for example, risk scores or labels on sections of video, audio, chats, documents, or other digital media. Such risk scores or labels may be used for a variety of downstream purposes, such as compliance, oversight, privacy, law enforcement, or other purposes. One example application is as part of regulatory review workflow in which video/audio/chat/documents are annotated based on semantic relatedness for further automated or manual review and disposition.

FIG. 1 is a block diagram representing one embodiment of a semantic classification system 100. At a high level, semantic classification system 100 receives text to be analyzed, determines the semantic relatedness of segments of the text to concepts and categories and produces annotated content. Annotated content may include, for example, video files, audio files, chat transcripts, documents, or other content with risk scores or labels on sections of the video, audio, chat transcripts, or documents. In some cases, the annotated content can be used to improve the classifiers of semantic classification system 100.

More particularly, FIG. 1 illustrates one embodiment of a classifier 102 processing a set of text 104 to produce annotated text 106. Set of text 104 can be any set of text selected for evaluation. Classifier 102 is configured with an abstract category 110 and executes to determine the relatedness of text 104 to Category_1 (category 110). While only one abstract category and classifier is illustrated, semantic classification system 100 may be configured with any number of abstract categories and execute any number of classifiers to annotate text according to the abstract categories.

Each abstract category is a defined logical collection of more specific subcategories and each subcategory comprises a set of words or phrases (sequences of words) relevant to that subcategory. In the illustrated embodiment, the subcategories represent semantic concepts within a broader abstract category. For example, category 110 includes Concept(A) (concept 112), Concept(B) (concept 114), and any number of additional concepts, with each concept comprising a defined logical collection of words or phrases related to the respective semantic concept.

In some embodiments, the words or phrases for a concept are determined using machine learning techniques, for example by providing a machine learning model with a corpus of labelled text for the machine learning model to determine the sets of words or phrases that correspond to a concept. In addition, or in the alternative, the sets of words or phrases may be provided, augmented, or edited by a user. For example, semantic classification system 100 may provide a user interface to allow a user to provide, edit, or augment the words or phrases corresponding to each concept.

The concepts may be seeded with an initial collection of words or phrases, such as a collection of words or phrases derived from data or provided by a user with domain expertise. Each concept can be run against a large number of text segments to determine the text segments that are semantically related to the concept. Thus, automated classification of text as related to categories or concepts can begin without requiring a large set of training data labeled with the categories or concepts.

The collection of words or phrases for a concept can be updated based on the results of ongoing classification. To provide an example, concept 112 may be seeded with an initial set of words or phrases. If a text segment is marked as semantically related the concept 112, the text segment can be added to the collection of words or phrases of the concept 112 (in some cases based on review of the text segment to confirm that it is actually related to the concept and is different enough from the other words and phrases in the concept). As will be appreciated then, a diverse set of words or phrases for classification can be determined through ongoing processing from a relatively small seed set. Conversely, words or phrases may be removed from a concept based on the results of ongoing classification. If a text segment is determined to be semantically related to a concept, but on review it is determined that the segment is not actually related to the concept, the word or phrase of the concept that caused the segment to be identified can be removed from the concept. The words or phrases for a concept can thus be further refined.

Semantic classification system 100 includes classifiers to determine the semantic relatedness of text to concepts or categories. For example, semantic classification system 100 includes classifier 102 to classify text according to category 110. While only one category and classifier are illustrated, semantic classification system 100 may include any number of categories and classifiers. In some embodiments, a single classifier may classify according to multiple categories or multiple classifiers may classify according to a single category. In some embodiments, the structure of a category may be considered to be part of the structure of a classifier that classifies text based on that category.

Classifier 102 comprises a set of processes to window, embed and aggregate embeddings (block 120), determine concept scores representing the relatedness of the segments of text to concepts (block 122), and aggregate the concept scores over segments to determine a category score and classify the text (block 124). In some embodiments, windowing, embedding, aggregating embeddings, determining concept relatedness, determining a category score, and annotating text may be performed by independently executing processes. In other embodiments, two or more of windowing, embedding, aggregating embeddings, determining concept relatedness, determining a category score, and annotating text may be combined in a single process.

With respect to block 120, semantic classification system 100 embeds the text 104 using one or more embeddings (before or after windowing process). During embedding, the set of text 104 is processed by an embedding process to convert text from the set of text 104 to arrays of real numbers. The embedding process may apply any number of full word embeddings, sub-word embeddings, or other types of embeddings, such as contextual or phrase embeddings, and combine embeddings in various ways ranging from simple concatenation to complex non-linear transformations. In some embodiments, some or all of these embeddings may be full word embeddings or sub-word (word piece) embeddings in which the embedding process converts each full word or sub-word in a set of text to a corresponding vector of numbers. Some embodiments also use contextual embeddings to further refine the semantic embedding of any sub-word or word based on the surrounding context words.

Various embedding techniques may be used including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification. Some embodiments can use techniques of transfer learning to leverage such pre-trained embeddings. In some embodiments, the transfer learning can include fine tuning to a specific application domain. In other embodiments, transfer learning is performed without fine tuning. Other machine learning techniques may also be used. According to one embodiment, distilBERT embeddings are used—as will be appreciated distilBERT embeddings are contextual embeddings—though other embedding techniques or combinations thereof may be used.

Further, as will be appreciated, there are a number of commercially available cloud-based, word embedding systems that may be leveraged. In some embodiments, the embedding process may send text to an external embedding system and receive the embedded text from the external system.

Figure 2A:
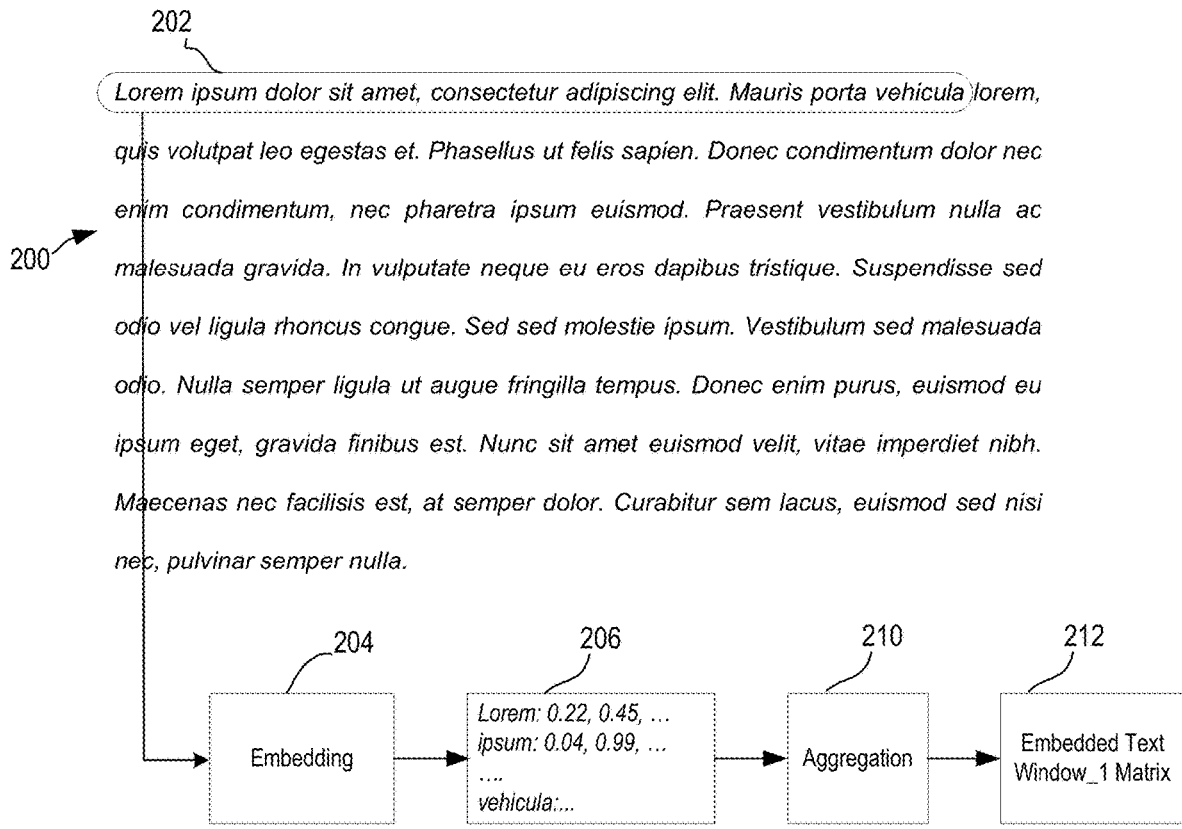
FIG. 2A and FIG. 2B are diagrammatic representations of a first embodiment of generating windowed and embedded text.
Figure 2B:
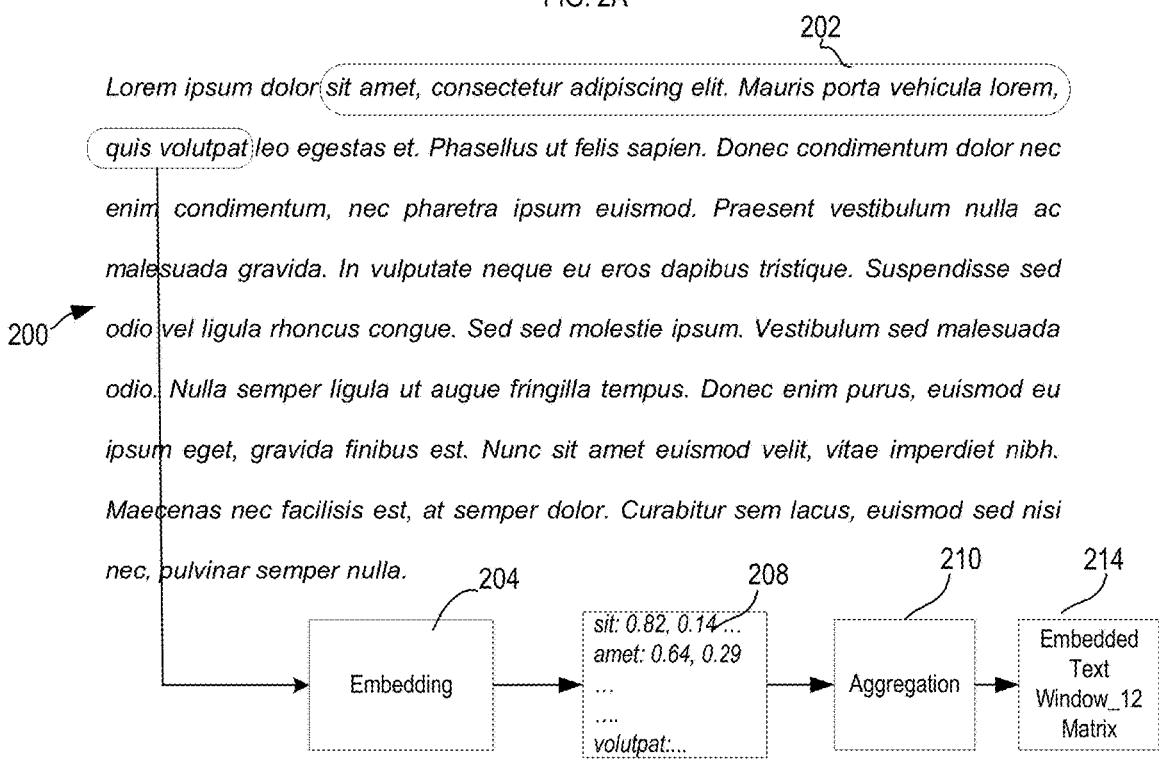
Figure 3:
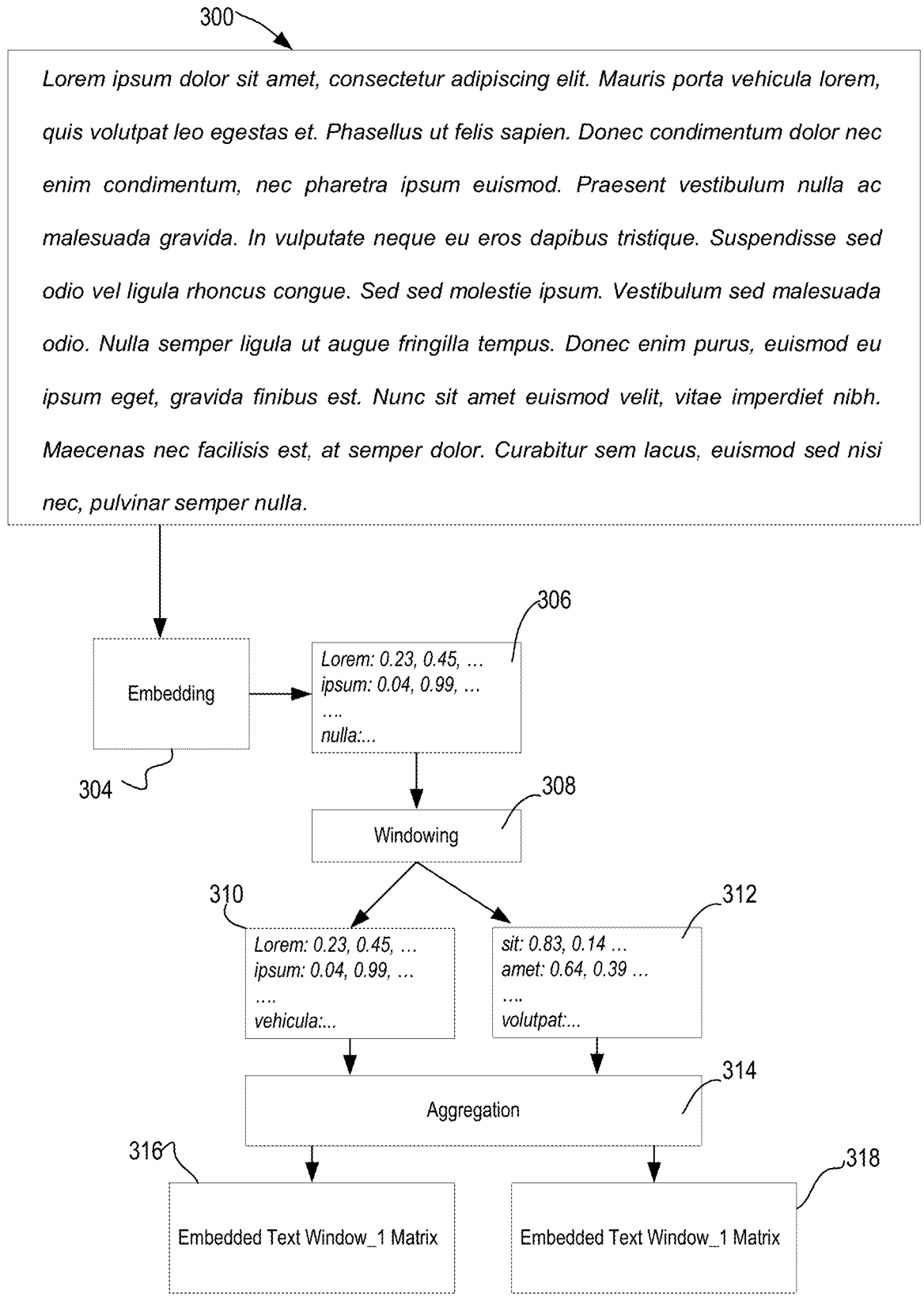
FIG. 3 is a diagrammatic representation of another embodiment of generating windowed and embedded text.

In one embodiment, the set of text 104 is processed by a windowing process to select segments of the text and each segment of text is fed to an embedding process for embedding. In another embodiment, the embedding process embeds all the words of the set of text and then the windowing process determines selected segments of the embedded text. FIG. 2A, FIG. 2B and FIG. 3 illustrate some examples of these embodiments in more detail. In the illustrated embodiment then, classifier 102 processes the set of text 104 to generate embedded text 126 that includes embedded text matrix 128 (Embedded Text Window Matrix 1) representing a first segment from the set of text 104, embedded text matrix 129 (Embedded Text Window Matrix_2) representing a second segment from the set of text 104 and so on.

Figure 4:
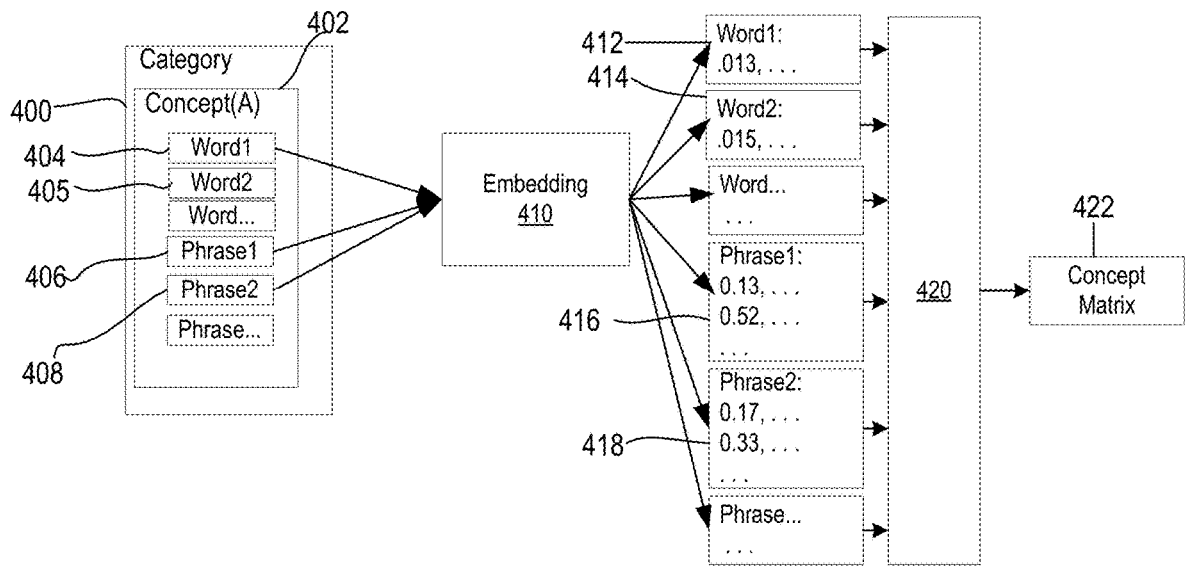
FIG. 4 is a diagrammatic representation of one embodiment of embedding a concept.

As discussed above, each category may have one or more sets of words or phrases to describe one or more concepts. These sets of words/phrases are also converted using embeddings. More particularly, semantic classification system 100 converts each word (whether as a single word or as part of a phrase) in the collection of words or phrases for a concept into a vector and aggregates the vectors to create a matrix representation of the concept. In the illustrated embodiment, for example, semantic classification system 100 processes the words and phrases of category 110 (Category_1) to generate Embedded_Category_1, which includes a numeric representation of Concept(A) (concept matrix 132), a numeric representation of Concept(B) (concept matrix 134) and so on. In some embodiments, the embedded category used by a classifier is generated beforehand and stored for use by the classifier. For example, semantic classification system 100 may store concept matrix 132 (Concept(A)_Matrix) representing Concept(A), concept matrix 134 representing Concept(B) and so on for later use. FIG. 4 illustrates one embodiment of generating an embedded category.

In some embodiments, the concept matrices can be further processed using methods such as Principal Components Analysis (PCA) or other such dimensionality reduction methods. This can be done to improve performance in terms of speed and/or accuracy. Further, in some embodiments, a classifier (e.g., classifier 102) can aggregate vectors representing text from the set of text 104 in a manner similar to that used to aggregate the arrays representing the words and phrases of a concept. This allows efficient algebra operations to be used to determine the projection of the set of text onto each concept embedding, which can be further processed to determine semantic relatedness.

The embedded text is evaluated against each category or a subset of categories (for example, a user-specified subset of categories). In the illustrated embodiment, classifier 102 evaluates embedded text 126 against category 110. Embedded text 126 may also be evaluated against other categories based, for example, on a user-selection of categories, configuration information, or other information.

For each segment from a set of text to be analyzed by a classifier, the embedded text can be projected onto or otherwise evaluated against the embedded concepts for the corresponding category handled by the classifier to determine the semantic relatedness of the text segment to each of the concepts. More particularly, in some embodiments, the corresponding embedded text matrix for each segment of the text is projected or otherwise evaluated against each concept matrix for a category to determine a single relatedness score for each segment/concept pair.

Figure 5:
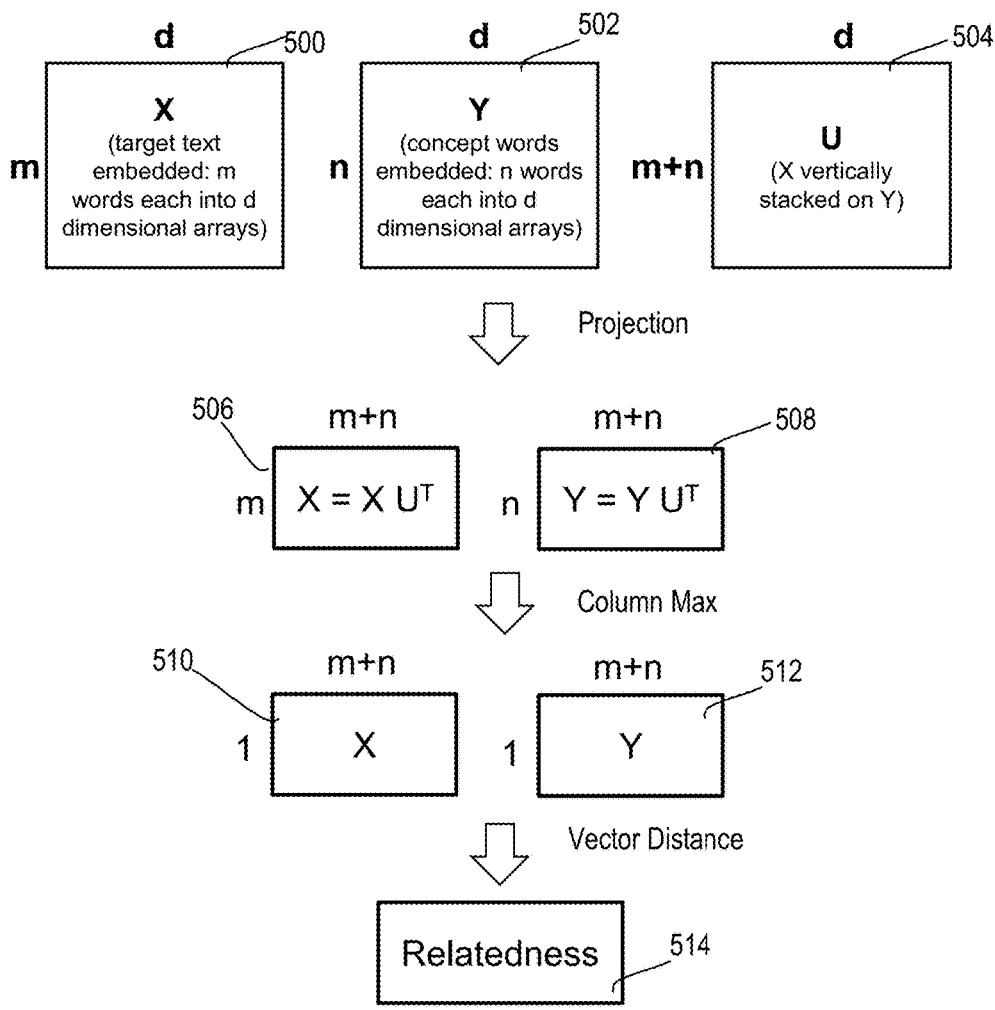
FIG. 5 is a diagrammatic representation of one embodiment of determining the semantic relatedness of a segment of text to a concept.

In the illustrated embodiment, classifier 102 (at block 122), processes embedded text 126 to determine a relatedness of each segment from the set of text 104 to each concept from category 110. That is, classifier 102 determines a concept relatedness score 142 for embedded text matrix 128 (Embedded Text Window Matrix 1) with respect to concept matrix 132 (Concept(A)_Matrix), a concept relatedness score 144 for embedded text matrix 129 (Embedded Text Window Matrix_2) with respect to concept matrix 132 (Concept(A)_Matrix) and so on to generate a set of concept relatedness scores 140 for a set of text 104. FIG. 5 illustrates one embodiment of reducing a numeric representation of a segment of text to a concept relatedness score representing the relatedness of a segment of text to a semantic concept.

The determination of the semantic relatedness of segments of text to concepts can be repeated for each segment of text in a set of text and each concept in a category. The classifier can consolidate the results, which may include zero or more matches to the category associated with the classifier.

At block 124, classifier 102 can map concept relatedness to category relatedness (e.g., based on various rules).

According to one embodiment, classifier 102 will determine whether to mark a segment of text as related to a concept if the concept relatedness score for that segment/concept pair in the set of concept relatedness scores 140 is above a threshold. In some embodiments, this threshold can be tuned to each concept based on an error analysis over an existing annotated dataset. In one embodiment, if the text is marked as related to any of the concepts, then it is related to the category. Other rules may also be defined. Moreover, the mapping of concept relatedness to category relatedness can be arbitrarily defined for different classifiers in semantic classification system 100.

If classifier 102 determines that the set of text 104 is sufficiently related to category 110, classifier 102 labels the text as related to the category to produce annotated text 106. In some embodiments, classifier 102 labels the segments from the set of text 104 as related to the category or individual concepts within the category based on the set of concept relatedness scores 140. Thus, in some embodiments, annotated text 106 may also be labeled with individual concepts from the category.

Semantic classification system 100 provides interfaces 150 to receive blocks of text to be analyzed. By way of example, but not limitation, interfaces 150 may include an application programming interfaces (API), an email interface to receive text by email, a website to allow the upload of text or other types of interfaces. Text may be provided from various data sources, including processes that convert non-text data sources (for example, digital audio and digital video) into text.

The text to be analyzed may be received in a variety of formats. For example, semantic classification system may receive documents 152 (e.g., text or rich text based electronic documents such as word processing documents, Adobe Portable Document Files (PDF), electronic emails, or other documents), electronic chat transcripts 154 (e.g., chat transcript digital files as provided by electronic chat applications), audio transcript files 156, video transcript files 158, or text extracted from video frames or images. Electronic documents 152 and chat transcript digital files 154 are natively text-based. For digital audio 162 and digital video 164, on the other hand, a transcription engine 166 may electronically transcribe the audio streams of the files to produce transcription files. For example, transcription engine 166 may take in media in MP4, MKV, MOV, or other formats—and transcribe spoken text to produce an audio transcript file or a video transcript file. Digital video 164 may further have its visual scenes processed by a frame processing engine 168 to extract text present in the recording to produce extracted text 160. In some embodiments, the blocks of text are received from external systems. In other embodiments, semantic classification system 100 receives data and produces text by, for example, implementing a transcription engine, frame processing engine, OCR engine or other processes to extract text.

Set of text 104 may be a block of text, such as an entire file or designated portion of a file or other block of text from a document, chat transcript, audio transcript, video transcript, set of extracted text or other source. As such, annotated text 106 may be an annotated block of text, such as an annotated document, chat transcript, audio transcript, video transcript, set of extracted text or other type of text (or portion thereof).

Annotated text can be stored for downstream applications. For example, semantic classification system 100 may store annotated text that includes audio files, video files, documents, chat transcripts, or other content annotated with metadata indicating the portions within the files that were determined to be semantically related to one or more of the categories or concepts. In some cases, the metadata for a file may include the relatedness or other indication of the strength of the semantic relatedness of one or more portions of the file to one or more concepts.

The annotations generated by semantic classification system 100 may be used for a variety of purposes. For example, segments marked as being semantically related to a concept may be reviewed to determine if the segments should be added to the collection of words and phrases for the concept.

Figure 6:
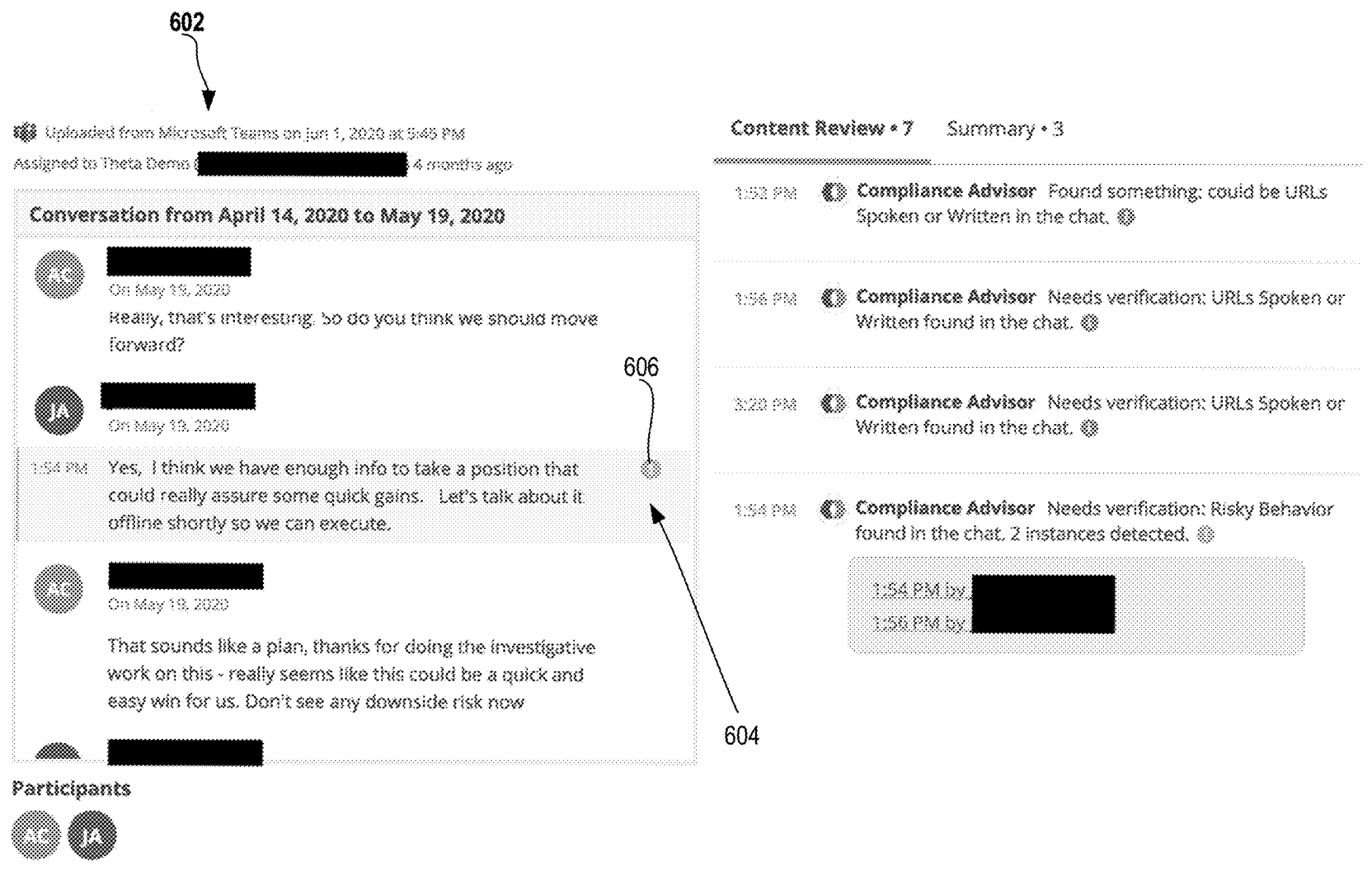

As another example, the annotations may be used to aid in risk, compliance, or security reviews or other processes. For example, one embodiment provides access to annotated content for review at client machines. The semantic classification system 100 provides a user interface through which a user can review annotated content, including at least some of the annotations generated by semantic classification system 100, for compliance purposes. FIG. 6 illustrates one embodiment of annotated text presented for review.

Turning briefly to FIG. 2A and FIG. 2B, one embodiment of selecting and embedding segments of the set of text to create embedded text is illustrated. In the depicted embodiment, a windowing process selects segments of text from the block of text 200 using a sliding-window offset approach. The sliding window used by the windowing process can be of various lengths with different tradeoffs between execution speed and downstream accuracy and/or precision. In some embodiments, the size of the window may be set in a set of configuration parameters. In the embodiment of FIG. 2A and FIG. 2B, a window size of eleven words is used.

The windowing process positions the sliding window 202 at the start of the block of text 200 and selects the segment of text that falls in a sliding window 202. Thus, in FIG. 2A, the windowing process selects "Lorem ipsum dolor sit amet, consectetur adipiscing elit. Mauris porta vehicula" as the first segment of text from the block of text 200 and feeds the segment to the embedding process 204. Embedding process 204 converts each word in the segment into a vector of real numbers representing that word, thus generating a set of vectors 206 representing the segment.

When the embedding process (or embedding and aggregation) has completed for the first selection of text, the windowing process slides the window 202 based on an offset. In one embodiment, the offset is a fraction of the window size. The offset or fraction of window size may be set in a set of configuration parameters in some embodiments.

In the example illustrated in FIG. 2B, the windowing process advances sliding window 202 three words and selects the text corresponding to the new position of window 202 as a second segment of text for processing. In this example, the windowing process feeds the segment "sit amet, consectetur adipiscing elft. Mauris porta vehicula lorem, quis volutpat" to embedding process 204, which converts each word from the selected segment of text into a corresponding vector to generate the set of vectors 208.

The windowing process can continue to advance sliding window 202 and feed segments of text to embedding process 204 until all the segments from the block of text 200 have been processed. It can be noted that if the block of text to be analyzed is shorter than the window, then the entire block can be logically treated as a single segment of text. For example, if the window size is eleven, and the entire block of text to be analyzed is a sentence that is only eight words long, then the sentence can be treated as a segment for further processing even though it is the entirety of the block of text.

A classifier (e.g., classifier 102) may receive a set of vectors representing an embedded segment of text and aggregate the vectors into an array that provides a numeric representation of the segment of text. For example, an aggregation process 210 aggregates the set of vectors 206 generated by embedding the first segment of block 200 to form embedded text matrix 212 (FIG. 2A) and the set of vectors 208 generated by embedding the second segment of block 200 to generate embedded text matrix 214 (FIG. 2B). The process can be repeated to create embedded text matrices corresponding to each segment of block 200. According to one embodiment, aggregation process 210 aggregates vectors through vertical concatenation. Other methods of aggregating the vectors into a combined structure representing a segment of embedded text can be used. These methods can range from simple concatenation to complex non-linear transformations.

While FIG. 2A and FIG. 2B illustrate embedding text using full word embeddings for simplicity, other embodiments may use sub-word embeddings, and even more particularly, sub-word contextual embeddings to embed each segment of text.

FIG. 3 illustrates an embodiment in which embedding occurs prior to windowing. In the embodiment of FIG. 3, embedding process 304 embeds the whole block of text 300, generating a set of vectors 306 including a vector for each word in the block of text 300. Windowing process 308 uses a sliding offset approach to collect vectors corresponding to each segment of text and provides the vectors to the classifier (e.g., classifier 102) for aggregation. For example, windowing process 308 can collect a first subset of vectors 310 that includes the first eleven vectors from the set of vectors 306—that is, windowing process 308 can collect the vectors corresponding to the words: "Lorem ipsum dolor sit amet, consectetur adipiscing elit. Mauris porta vehicula"—and send the first subset of vectors 310 to the classifier for aggregation. Similarly, windowing process 308 can collect a second subset of vectors 312 that includes fourth through fourteenth vectors from the set of vectors 306—that is, windowing process 308 can collect the vectors corresponding to the words: "sit amet, consectetur adipiscing elit. Mauris porta vehicula lorem, quis volutpat"—and send the second subset of vectors 312 to the classifier for classification, and so on. Again, if the entire block of text is smaller than the window, then the entire block can be treated as one segment for further processing even though it is the entirety of the block of text.

A classifier (e.g., classifier 102) may receive a set of vectors representing an embedded segment of text and aggregate the vectors into an array that provides a numeric representation of the segment of text. For example, an aggregation process 314 aggregates the set of vectors 310 corresponding to a first segment of block 300 to form embedded text matrix 316 representing the segment of text "Lorem ipsum dolor sit amet, consectetur adipiscing elit. Mauris porta vehicula" and the set of vectors 312 corresponding to a second segment of block 300 to generate embedded text matrix 318 representing the text "sit amet, consectetur adipiscing elit. Mauris porta vehicula lorem, quis volutpat". The process can be repeated to create embedded text matrices representing each segment of block 300. According to one embodiment, aggregation process 314 aggregates vectors through vertical concatenation. Other methods of aggregating the vectors into a combined structure representing a segment of embedded text can be used. These methods can range from simple concatenation to complex non-linear transformations.

While FIG. 3 illustrates the block of text 300 using full word embeddings for simplicity, other embodiments may use sub-word embeddings, and even more particularly, sub-word contextual embeddings to embed the text from block of text 300.

Turning to FIG. 4, one embodiment of embedding a concept 402 of a category 400 is illustrated. In the embodiment of FIG. 4, each word or phrase from a concept 402 is provided to an embedding process 410 which converts each word into a vector, where each phrase is represented as a matrix of the row vectors generated for the words in that phrase. For example, embedding process 410 converts word 404 into vector 412, word 405 into vector 414, phrase 406 into matrix 416 of the row vectors generated for each word in phrase 406, phrase 408 into matrix 418 of the row vectors generated for each word in phrase 408, and so on for each word or phrase of concept 402.

The classifier (e.g., classifier 102) aggregates the arrays generated by embedding the collection of words and phrases of a concept to generate a matrix representation of the concept. According to one embodiment, for example, aggregation process 420 aggregates the arrays generated by embedding the collection of words and phrases of concept 402—that is vector 412, vector 414, matrix 416, matrix 418 and any other arrays generated by embedding the words or phrases of concept 402—into concept matrix 422, which provides a numeric representation of concept 402. According to one embodiment, the arrays are aggregated through vertical concatenation. Other methods of aggregating a concept's word or phrase embeddings into a combined embedding structure may be used. These methods can range from simple concatenation to complex non-linear transformations. In some embodiments, the concept matrices can be pre-computed and archived for use by the classifier.

This process can be performed for each concept of a category to generate an embedded category comprising concept matrices representing the concepts of the category. For example, in FIG. 1, embedded category 130 (Embedded_Category_1) may be a collection of concept matrices representing the concepts of category 110 (Category_1).

In some embodiments, the concept matrices can be further processed using methods such as Principal Components Analysis (PCA) or other such dimensionality reduction methods. This is done to improve performance in terms of speed and/or accuracy.

A classifier can aggregate vectors representing text in a manner similar to that used to aggregate the arrays representing words and phrases of concepts. As discussed above, this allows efficient algebra operations to be used to determine the projection of text onto each concept's embedding, which can be further processed to determine semantic relatedness.

For example, as discussed above in conjunction with FIG. 2A, FIG. 2B and FIG. 3, a classifier may receive a set of vectors representing an embedded segment of text and aggregate the vectors into a matrix that provides a numeric representation of the segment of text. In some embodiments, the classifier aggregates the vectors by vertical concatenation to generate an embedded text matrix representing the segment of text. If any post-processing of the concept matrices used by the classifier was performed, an analogous operation can be performed on the embedded text matrices to match dimensions so that the embedded text matrices and concept matrices can be multiplied.

For each segment of text from a set of text to be analyzed by a classifier, the embedded text can be projected onto or otherwise evaluated against the embedded concepts for the corresponding category handled by the classifier to determine the semantic relatedness of the segment text to each of the concepts. More particularly, in some embodiments, the corresponding embedded text matrix for that segment of text is projected onto each concept matrix for a category. For example, the classifier can project the embedded text matrix (e.g., embedded text matrix 212) representing the segment "Lorem ipsum dolor sit amet, consectetur adipiscing elit. Mauris porta vehicula" onto each concept matrix of an embedded category to generate a number representing the semantic relatedness of the segment of text to each concept.

Using the example of FIG. 1, classifier 102 (at block 122), can project embedded text matrix 128 (Embedded Text Window Matrix 1) onto concept matrix 132 (Concept(A)_Matrix) to determine concept relatedness score 142, project embedded text matrix 128 (Embedded Text Window Matrix 1) onto concept matrix 134 (Concept(B)_Matrix) to determine concept relatedness score 146 and so on.

FIG. 5 illustrates one embodiment of reducing the numeric representation of a segment of text (e.g., embedded text matrix 500) and the numeric representation of a concept (e.g., concept matrix 502) to a single number representing the degree of relatedness of the two (relatedness 514). According to one embodiment, this reduction can be performed according to "Don't Settle for Average, Go for the Max: Fuzzy Sets and Max-Pooled Word Vectors", arXiv: 1904.13264v1, 30 Apr. 2019, which is hereby fully incorporated herein by reference for all purposes.

More particularly, embedded text matrix 500 and concept matrix are combined into universe 504, which is then multiplied by the two original matrices separately. That is, embedded text matrix 500 and concept matrix 502 are combined into universe 504 and then universe 504 is multiplied by matrix 500 to generate matrix 506 and universe 504 is multiplied by matrix 502 to generate matrix 508.

A column wise max operation is performed to convert matrices 506, 508 to vectors. That is, i) a column wise max operation is performed on matrix 506 to generate vector 510; and ii) a column wise max operation is performed on matrix 508 to generate vector 512. Any of the various vector distance metrics can then be used to reduce vectors 510, 512 to a single number representing the semantic relatedness of the segment of text to the concept. In one embodiment, the vector distance metric outlined in "Don't Settle for Average, Go for the Max: Fuzzy Sets and Max-Pooled Word Vectors", arXiv:1904.13264v1, 30 Apr. 2019 may be used. More particularly, relatedness 514 be determined according to the DynaMax-Jaccard Similarity Metric:

$$\text{relatedness} = \frac{\sum_{i=1}^{m+n} \min(X_i, Y_i)}{\sum_{i=1}^{m+n} \max(X_i, Y_i)} \quad [\text{EQN. 1}]$$

where: m is the number of embedded words from the text being evaluated (the segment of text),
n is the number of embedded words from the concept,
X is the vector representing the text being evaluated (e.g., vector 510), and
Y is the vector representing the concept (e.g., vector 512).

Other embodiments may use methods other than the DynaMax-Jaccard approach to create a metric for semantic relatedness.

The embodiment of FIG. 5 is provided by way of example and not limitation and other methods of reducing a numeric representation of a segment of text and a numeric representation of a semantic concept (or other type of subcategory) can be used. For example, in some embodiments, the universe 504 can be the union of all words/phrases over all concepts for a category. Other changes can also be made.

According to one embodiment, a predefined threshold is used to determine whether the semantic relatedness 514 resulting from this operation is sufficient to mark the segment of text as being semantically related to the concept. This threshold can be tuned to each concept based on an error analysis over an existing annotated dataset. In some embodiments, the threshold may be set as a configuration parameter. The threshold, in some embodiments, can be determined based on a data driven supervised machine learning approach.

According to one embodiment of the method of detecting semantic relatedness, the projection and similarity calculation are combined into a single operation. Moreover, in some embodiments, the projection, similarity calculation and thresholding step are combined into a single operation.

FIG. 6 illustrates one embodiment of a user interface screen displaying an annotated online chat transcript 602. As illustrated, the semantic relatedness system has annotated a portion 604 of the chat transcript as corresponding to a "risky behavior" category, as shown by annotation 606. This can be surfaced via the user interface to allow a compliance advisor to determine whether remedial action is required.

Figure 7:
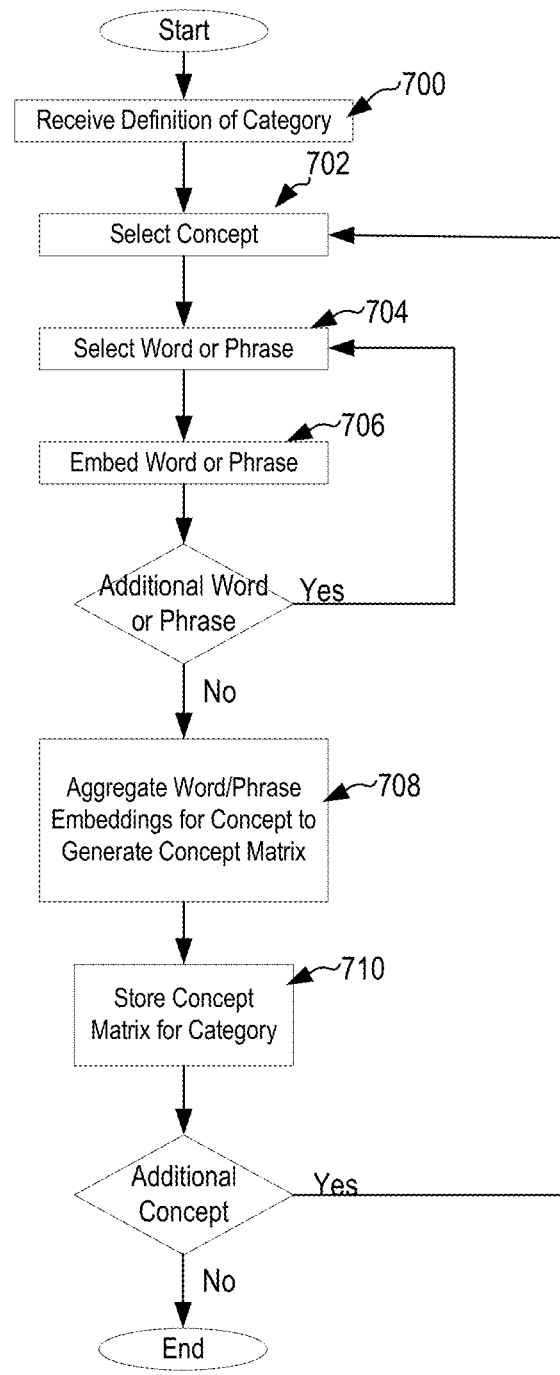
FIG. 7 is a flow chart illustrating one embodiment of embedding a category.

FIG. 7 is a flow chart illustrating one embodiment of generating concept matrices for a category. In some embodiments, the method may be embodied as a set of computer executable instructions stored on a non-transitory computer readable medium. Various steps of FIG. 7 may be carried out by a classification system, such as semantic classification system 100, other classification systems or other computer systems.

At step 700, a classification system may receive a definition of an abstract category. The abstract category, according to one embodiment, is a defined logical collection of concepts, and each concept is a defined logical collection of words or phrases.

At step 702, a concept from the category is selected. At step 704, a word or phrase from the selected concept is selected. At step 706, the word or phrase is converted to a numeric representation of the word or phrase. For example, an embedding can be applied to convert the word to a vector representation of the word. For a phrase, each word in the phrase can be converted to a respective vector representation and the vectors generated from the words in a phrase aggregated into an array, such as a matrix of the row vectors generated from the words of the phrase. Steps 704 and 706 may be repeated for each word or phrase in the concept.

Various embedding techniques may be used at step 706 including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification. Some embodiments can use techniques of transfer learning to leverage such pre-trained embeddings. In some embodiments, the transfer learning can include fine tuning to a specific application domain. In other embodiments, transfer learning is performed without fine tuning. Other machine learning techniques may also be used. According to one embodiment, distilBERT embeddings are used, though other embedding techniques or combinations thereof may be used.

Further, as will be appreciated, there are a number of commercially available cloud-based, word embedding systems that may be leveraged. In some embodiments, the embedding process may send text to an external embedding system and receive the embedded segment from the external system.

At step 708, the numeric representations of the words and phrases in a concept can be aggregated to create a numeric representation of the concept. Using the example of FIG. 4, vector 412, vector 414, matrix 416, matrix 418, and the embeddings of other words or phrases of concept 402 can be aggregated into a numeric representation of concept 402, such as a concept matrix 422. According to one embodiment, the embeddings generated based on the words and phrases of a concept are concatenated vertically to form an embedded concept matrix representing the selected concept.

At step 710, the numeric representation of the concept can be stored for use by a classifier. Steps 702-710 can be repeated for each concept in the category to generate an embedded category comprising a set of embedded concepts.

FIG. 7 is provided by way of example and not limitation. Various steps may be repeated, steps may be performed in different orders, steps omitted, and additional or alternative steps performed. By way of example, but not limitation, the steps of FIG. 7 can be repeated for each category.

Figure 8:
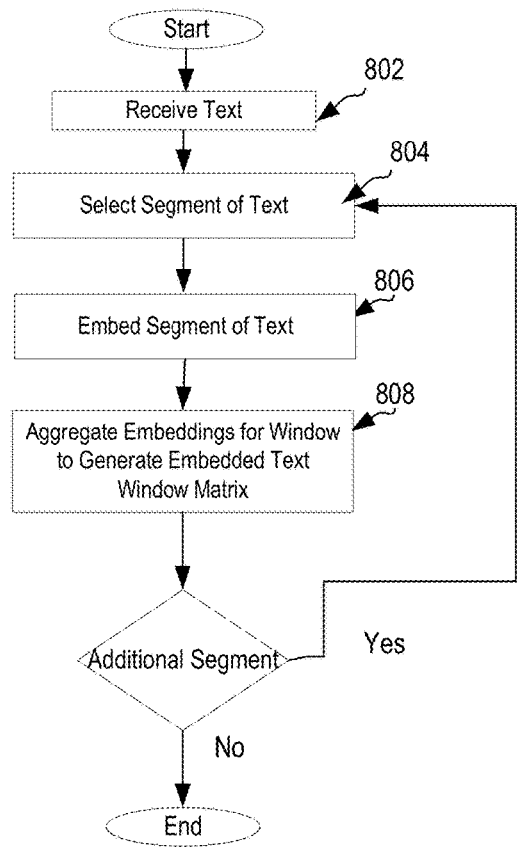
FIG. 8 is a flow chart illustrating one embodiment of embedding a set of text.

FIG. 8 is a flow chart illustrating one embodiment of generating numeric representations of segments of text. In some embodiments, the method may be embodied as a set of computer executable instructions stored on a non-transitory computer readable medium. Various steps of FIG. 8 may be carried out by a classification system, such as semantic classification system 100, other classification systems or other computer systems.

At step 802, the classification system can receive a set of text for classification. The text may come from a document, a chat transcript, the result of transcription of audio or video files, the result of OCR, or come from some other source.

At step 804, the classification system selects a first segment from the text. According to one embodiment, the classification system may use a sliding window to select segments of the text. At step 806, the classification system embeds the segment of text. In particular, the classification system can convert each word or sub-word in the selected segment of text into a corresponding vector.

Various embedding techniques may be used at step 806 including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification. Some embodiments can use techniques of transfer learning to leverage such pre-trained embeddings. In some embodiments, the transfer learning can include fine tuning to a specific application domain. In other embodiments, transfer learning is performed without fine tuning. Other machine learning techniques may also be used. According to one embodiment, distilBERT embeddings are used, though other embedding techniques or combinations thereof may be used.

Further, as will be appreciated, there are a number of commercially available cloud-based, word embedding systems that may be leveraged. In some embodiments, the embedding process may send text to an external embedding system and receive the embedded segment from the external system.

In any case, the embeddings used at 806 are preferably the same as those that were used or will be used to embed the concept against which the selected segment of text will be evaluated (e.g., at step 706 of FIG. 7).

At step 808, the classification system generates a numeric representation of the segment of text. More particularly, the vectors generated based on the selected segment of text are aggregated into a matrix or other numerical representation of the selected segment of text. In an even more particular embodiment, the vectors generated based on the selected segment of text are concatenated vertically to form an embedded text matrix representing the selected segment of text. Steps 804-808 may be repeated for each segment of text from the block of text, and steps 802-808 may be repeated for each block of text to be classified.

FIG. 8 is provided by way of example and not limitation. Various steps may be repeated, steps may be performed in different orders, steps omitted, and additional or alternative steps performed. By way of example, but not limitation, the steps of FIG. 8 can be repeated for each block or other set of text to be classified by a classifier.

Figure 9:
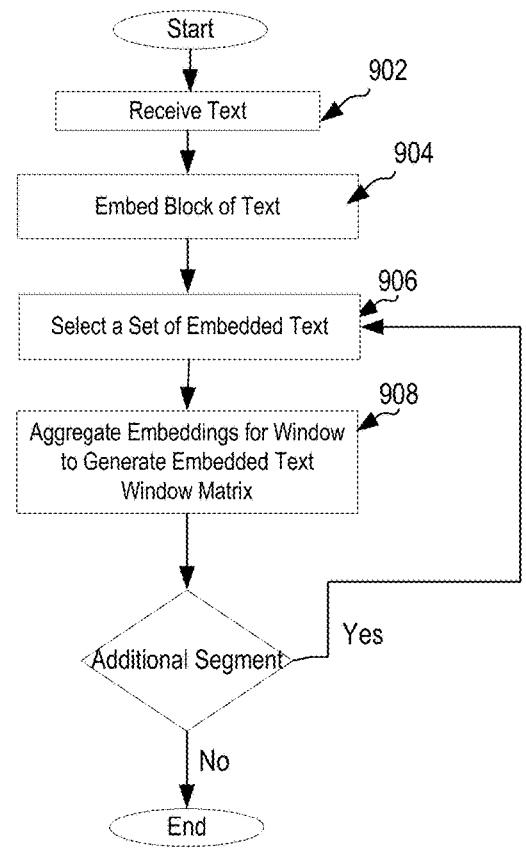
FIG. 9 is a flow chart illustrating another embodiment of embedding a set of text.

FIG. 9 is a flow chart illustrating another embodiment of generating numeric representations of segments of text. In some embodiments, the method may be embodied as a set of computer executable instructions stored on a non-transitory computer readable medium. Various steps of FIG. 9 may be carried out by a classification system, such as semantic classification system 100, other classification systems or other computer systems.

At step 902, the classification system can receive a set of text for classification. The text may come from a document, a chat transcript, the result of transcription of audio or video files, the result of OCR, or come from some other source.

At step 904, the classification system embeds the entire set of text. According to one embodiment, a vector is generated for each word or sub-word of the text. Various embedding techniques may be used at step 904 including, but not limited to, neural networks or other natural language processing techniques. By way of example, but not limitation, full word embeddings or sub-word embeddings may be pre-trained using deep neural networks with large amounts of data. Such embeddings provide the advantage of generalization without explicit specification. Some embodiments can use techniques of transfer learning to leverage such pre-trained embeddings. In some embodiments, the transfer learning can include fine tuning to a specific application domain. In other embodiments, transfer learning is performed without fine tuning. Other machine learning techniques may also be used. According to one embodiment, distilBERT embeddings are used, though other embedding techniques or combinations thereof may be used.

Further, as will be appreciated, there are a number of commercially available cloud-based, word embedding systems that may be leveraged. In some embodiments, the embedding process may send text to an external embedding system and receive the embedded segment from the external system.

In any case, the embeddings used at 904 are preferably the same as those that were used or will be used to embed the concept against which the selected segment of text will be evaluated (e.g., at step 706 of FIG. 7).

At step 906, the semantic classification system selects a set of embedded text. For example, the semantic classification system selects a window of vectors generated from the set of text. For example, the semantic classification system selects the vectors corresponding to a particular segment of the text. According to one embodiment, the classification system may use a sliding window to select vectors from the vectors generated at step 904.

At step 908, the classification system generates a numeric representation of a segment of text. More particularly, the selected vectors are aggregated into a matrix or other numerical representation of the selected segment of the text. In an even more particular embodiment, the selected vectors are concatenated vertically to form an embedded text matrix representing a segment of the text. Steps 906-908 may be repeated for each segment of text from the set of text.

FIG. 9 is provided by way of example and not limitation. Various steps may be repeated, steps may be performed in different orders, steps omitted, and additional or alternative steps performed. By way of example, but not limitation, the steps of FIG. 9 can be repeated for each block or other set of text to be classified by a classifier.

Figure 10:
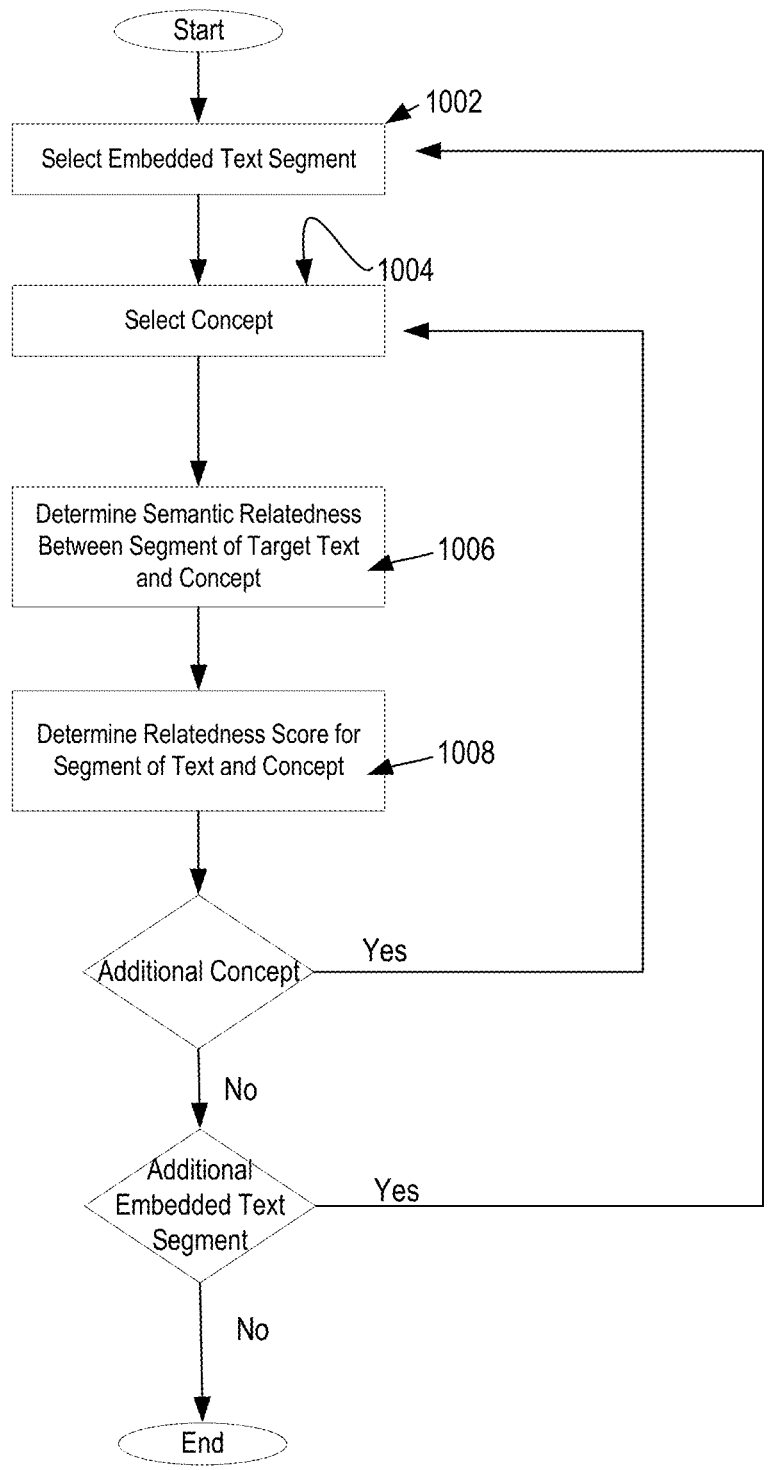
FIG. 10 is a flow chart illustrating one embodiment of determining semantic relatedness of segments and concepts.

FIG. 10 is a flow chart illustrating one embodiment of determining the relatedness of a set of text (e.g., a block of text) to the concepts of a category. In some embodiments, the method may be embodied as a set of computer executable instructions stored on a non-transitory computer readable medium. Various steps of FIG. 10 may be carried out by a classification system, such as semantic classification system 100, other classification systems or other computer systems.

As discussed, a set of text can be processed to generate embedded text segments (such as embedded text matrices) representing the segments of the text. At step 1002, an embedded text segment corresponding to a segment of text from the set of text is selected. At step 1004, a concept from the category against which the set of text is to be evaluated is selected.

At step 1006, the semantic classification system may generate a concept relatedness score for the combination of text segment and concept where the concept relatedness score represents the semantic relatedness of the selected segment of text and the selected concept. According to one embodiment, the numeric representation of a segment of text is projected onto the numeric representation of the selected concept to reduce the representation to a single number indicating the semantic relatedness of the of the selected segment of text and the selected concept. One non-limiting example of reducing the numeric representation of a segment of text and the numeric representation of a concept to a single number representing the degree of relatedness of the two is discussed in conjunction with FIG. 5.

Steps 1006-1008 can be repeated for an embedded text segment for each concept of the category. Steps 1002 can be repeated for each embedded text segment corresponding to a set of text.

FIG. 10 is provided by way of example and not limitation. Various steps may be repeated, steps may be performed in different orders, steps omitted, and additional or alternative steps performed. By way of example, but not limitation, the steps of FIG. 10 can be repeated for each set of text to be classified by a classifier and for each category against which the set of text is to be evaluated.

Figure 11:
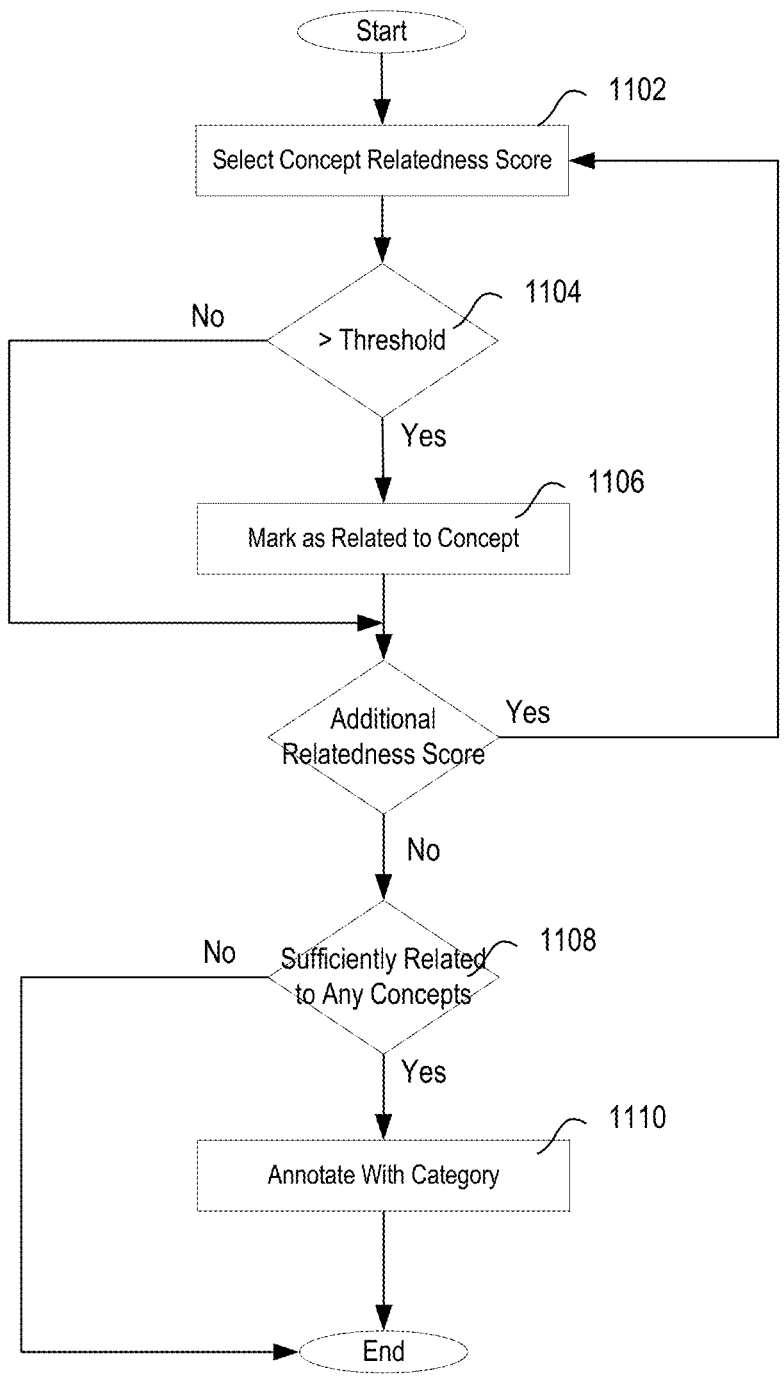
FIG. 11 is a flow chart illustrating one embodiment of classifying a set of text.

FIG. 11 is a flow chart illustrating one embodiment of determining whether a set of text (e.g., a block of text) is sufficiently related to a category to label the set of text according to the category. In some embodiments, the method may be embodied as a set of computer executable instructions stored on a non-transitory computer readable medium. Various steps of FIG. 11 may be carried out by a classification system, such as semantic classification system 100, other classification systems or other computer systems.

At step 1102, the classification system selects a concept relatedness score generated based on processing the set of text. For example, in determining whether the set of text 104 is sufficiently related to category 110, semantic classification system 100 may select concept relatedness score 142 corresponding to concept 112 of that category. At step 1104, the semantic classification system determines if the concept relatedness score is above a threshold. If so, the semantic classification system marks the segment of text corresponding to the relatedness score as related to the concept. The semantic classification system can repeat the evaluation of step 1104 and marking step 1106, if appropriate, for each concept relatedness score generated for a set of text based on a category.

At step 1108, the classification system determines whether to label the set of text as being semantically related to the category. In some embodiments, a set of text is labeled with the category if it is semantically related to any of the concepts of the category (e.g., as determined at step 1104). Other rules may also be defined. For example, labeling a set of text may depend on the number or percentage of concepts to which the segments from the set of text are sufficiently semantically related, the degrees of the semantic relationships between the segments and the concepts, or other factors. If it is determined that the set of text is sufficiently related to the category based on the rules, the set of text can be labeled with the category (step 1110).

FIG. 11 is provided by way of example and not limitation. Various steps may be repeated, steps may be performed in different orders, steps omitted, and additional or alternative steps performed. By way of example, but not limitation, the steps of FIG. 11 can be repeated for each set of text to be classified by a classifier and for each category against which the set of text is to be evaluated.

Figure 12:
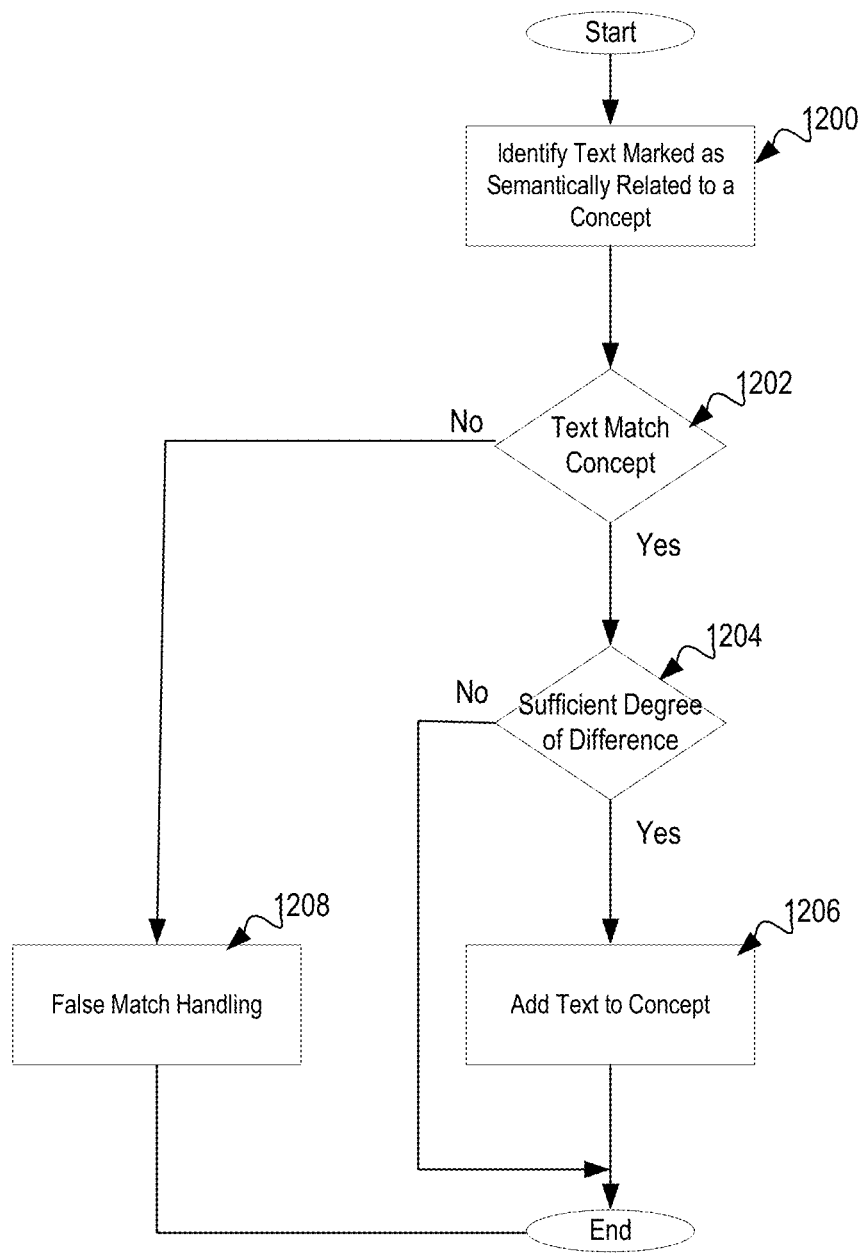
FIG. 12 is a flow chart illustrating one embodiment of updating a classifier.

FIG. 12 is a flow chart illustrating one embodiment of updating a classifier by updating a category. In some embodiments, the method may be embodied as a set of computer executable instructions stored on a non-transitory computer readable medium. Various steps of FIG. 12 may be carried out by a classification system, such as semantic classification system 100, other classification systems or other computer systems.

At step 1200, a set of text that is marked as semantically related to a concept of a category is identified. For example, a segment of text labelled with Concept(C) of category 110 can be identified from annotated content. At step 1202, it can be verified whether the set of text actually matches the concept. For example, if Concept C of category 110 is "exaggerated financial claim," it can be determined whether the identified set of text actually represents an exaggerated financial statement. In some embodiments, the verification can be performed by processing the identified set of text with a second machine learning model that is trained to identify exaggerated financial claims. In another embodiment, the set of text and concept description are presented to a human user in a graphical user interface for adjudication.

If it is agreed by an automated process or via human input that the segment does match the concept, then at step 1204 it can be determined if the identified text is different enough from the words and phrases of the concept such that it should be added to the concept. In one embodiment, a human user may be presented with the identified text and the words and phrases of the concept to determine whether the identified text should be added to the concept. If it is determined that the identified text should be added to the concept, the concept can be updated with the identified text (e.g., the concept can be updated with the identified segment as a new phrase) (step 1206).

Returning to step 1202, if it is determined that the identified text does not match the concept, then false positive handling may be implemented. In some embodiments, the segment of text may simply have the concept label and possibly a category label removed. Moreover, in some implementations, an analysis can be performed to determine which words or phrases in the concept that the identified text matched or to which the identified text has the strongest similarity. Those words or phrases may be adjusted or removed from the concept (step 1208).

FIG. 12 is provided by way of example and not limitation. Various steps may be repeated, steps may be performed in different orders, steps omitted, and additional or alternative steps performed. Moreover, in some embodiments, the decisions whether to add words or phrases to, modify words or phrases of, or remove words or phrases from a concept may be based on an analysis of a dataset of annotated text.

Figure 13:
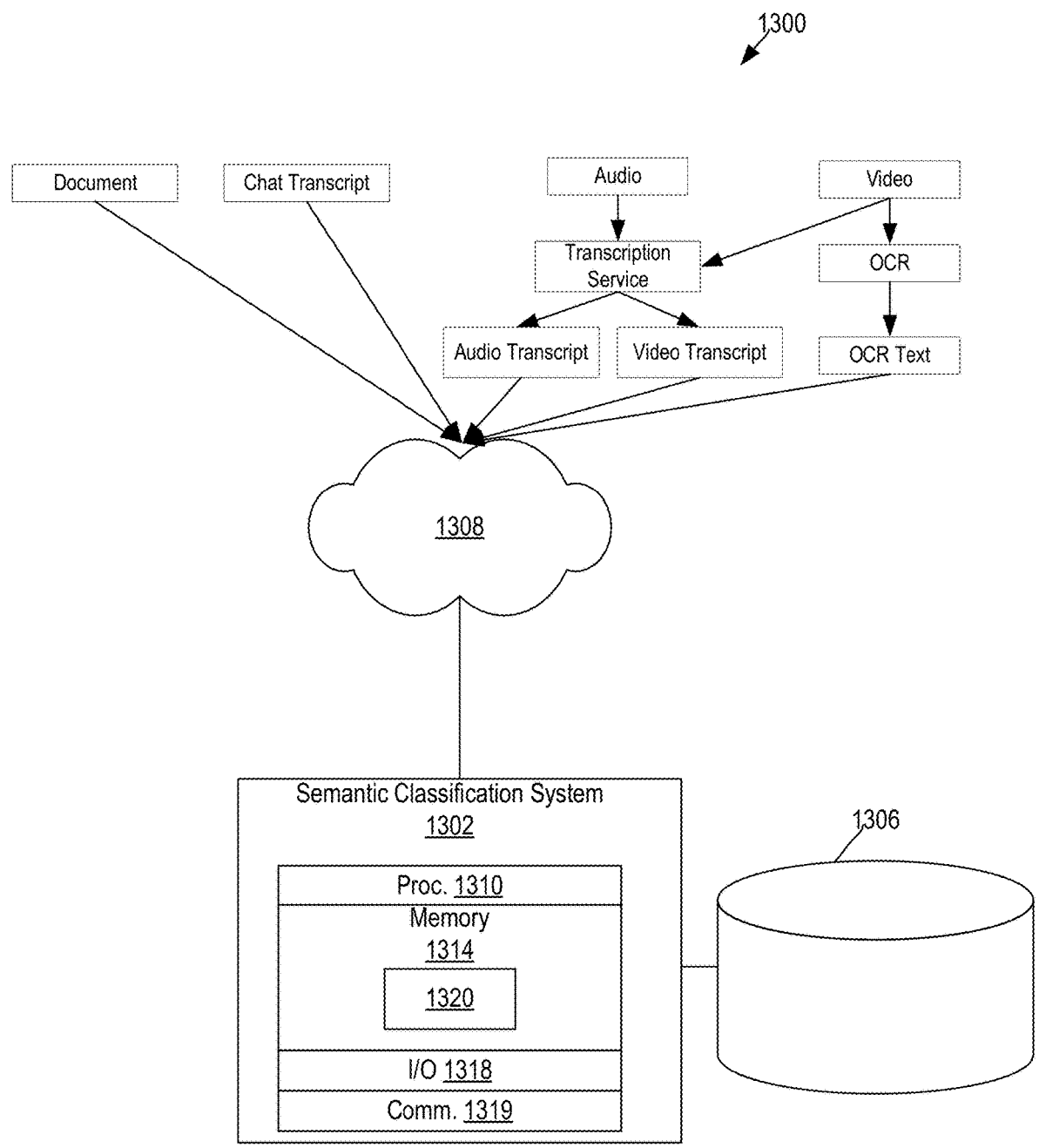
FIG. 13 is a diagrammatic representation of one embodiment of a network environment.

FIG. 13 is a diagrammatic representation of one embodiment of a system for semantic classification. The system for semantic classification may comprise one or more computer systems with central processing units executing instructions embodied on one or more computer-readable media where the instructions are configured to perform at least some of the functionality associated with embodiments of the present invention. In the illustrated embodiment, system 1300 includes a computer system 1302 having a computer processor 1310 and associated memory 1314. Computer processor 1310 may be an integrated circuit for processing instructions. For example, computer processor 1310 may comprise one or more cores or micro-cores of a processor. Memory 1314 may include volatile memory, non-volatile memory, semi-volatile memory or a combination thereof. Memory 1314, for example, may include RAM, ROM, flash memory, a hard disk drive, a solid-state drive, an optical storage medium (e.g., CD-ROM), or other computer-readable memory or combination thereof. Memory 1314 may implement a storage hierarchy that includes cache memory, primary memory or secondary memory. In some embodiments, memory 1314 may include storage space on a data storage array. Computer system 1302 may also include input/output ("I/O") devices 1318, such as a keyboard, monitor, printer, electronic pointing device (e.g., mouse, trackball, stylus, etc.), or the like. Computer system 1302 may also include a communication interface 1319, such as a network interface card, to interface with network 1308, which may be a local LAN, a WAN such as the Internet, mobile network, or other type of network or combination thereof. Network 1308 may represent a combination of wired and wireless networks that may be utilized for various types of network communications.

Memory 1314 may store instructions executable by computer processor 1310. For example, memory 1314 may include code executable to provide an interface, such as an API or other interface to allow data sources to provide over network 1308 text to be analyzed. According to one embodiment, memory 1314 may include code 1320 executable to provide a semantic classification system such as semantic classification system 100. Memory 1314 may store configuration data, definitions of categories, numerical representations of concepts or segments of text and other data. Data store 1306, which may be part of or separate from memory 1314, may comprise one or more database systems, file store systems, or other systems to implement, for example, an object store to store annotated content.

Each of the computers in FIG. 13 may have more than one CPU, ROM, RAM, HD, I/O, or other hardware components. Portions of the methods described herein may be implemented in suitable software code that may reside within memory 1314 or other computer-readable memory.

One embodiment includes a method of detecting semantic similarity to detect sections of speech, screen content, chat content, or document text within digital audio, video, chat or document files that are potentially semantically related to one or more abstract categories when those categories are not easily defined by a single word using one or more full word, sub-word, or contextual embeddings. Such methods may operate in conjunction with a rules-based system in some embodiments.

Another embodiment can include a non-transitory computer readable medium having stored therein computer program code, the computer program code comprising instructions for implementing a method of detecting semantic similarity to detect sections of speech, screen content, chat content, or document text within digital audio, video, chat or document files that are potentially semantically related to one or more abstract categories when those categories are not easily defined by a single word using one or more full word, sub-word, or contextual embeddings. In some embodiments, the method operates in conjunction with a rules-based system.

Yet another embodiment can include a computer system comprising a processor and a computer-readable medium having stored therein computer program code, the computer program code comprising instructions for implementing a method of detecting semantic similarity to detect sections of speech, screen content, chat content, or document text within digital audio, video, chat or document files that are potentially semantically related to one or more abstract categories when those categories are not easily defined by a single word using one or more full word, sub-word or contextual embeddings. In some embodiments, the computer system may operate in conjunction with a rules-based system.

According to one embodiment, a method of detecting semantic relatedness comprises analyzing text gleaned from the files, embedding the text, and calculating semantic relatedness to a set of concepts for each category where each concept includes a set of words/phrases embedded in a similar fashion. The embedding of the set of text to be evaluated can be projected onto each concept embedding and reduced to a single number score representing semantic relatedness which can then be thresholded to determine meaningful semantic relatedness.

A method of detecting semantic relatedness, in accordance with one embodiment, may comprise using any number of sub-word embeddings optionally in conjunction with any number of full word embeddings or other kinds of embeddings such as contextual or phrase embeddings. Multiple embeddings may be combined in many ways ranging from simple concatenation to complex non-linear transformations.

A method of detecting semantic similarity may comprise embedding all of a block of text prior to segmenting. In another embodiment, the text may be segmented using sliding windows prior to embedding the text. Sliding windows of different lengths may be used in some embodiments.

According to one embodiment of the method of detecting semantic relatedness, post processing of the embeddings is performed using machine learning and statistical analysis methods.

Various methods of aggregating a concept's word embeddings into a combined concept embedding structure may be used. These methods can range from simple concatenation to complex non-linear transformations.

Various methods of aggregating a certain number of word embeddings of the text may be used to allow for easier projection onto a concept embedding aggregated structure.

Further various methods to project the text embedding onto the concept embedding may be implemented. Furthermore, the semantic relatedness of the two embeddings may be determined in a variety of ways.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways to implement the invention.

It is also within the spirit and scope of the invention to implement in software programming or code in any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A semantic classification system comprising:
   a processor;
   a memory for storing a category, the category comprising a collection of semantic concepts, the collection of semantic concepts comprising a first semantic concept and a second semantic concept, each semantic concept in the collection of semantic concepts having an associated label and comprising a collection of semantically related words, sub-words, or phrases;
   a non-transitory, computer-readable medium storing a set of instructions that are executable by the processor, the set of instructions comprising instructions for:
      receiving a digital text to be evaluated against the category;
      converting the digital text into a plurality of embedded text segments using an embedding;
      converting the category into an embedded category comprising a plurality of embedded semantic concepts, said converting the category into the embedded category comprising embedding the collection of semantic concepts using the embedding;
      determining a relatedness score for each of the plurality of embedded text segments with respect to each of the plurality of embedded semantic concepts to determine a plurality of relatedness scores;
      determining that the digital text is related to the category based on the plurality of relatedness scores, the determining comprising comparing each relatedness score of the plurality of relatedness scores to a relatedness threshold for the collection of semantic concepts;
selecting a first semantic concept from the collection of semantic concepts for annotation based on the relatedness score corresponding to the first semantic concept satisfying the relatedness threshold;
based on a determination that the digital text is related to the category, annotating the digital text with the label of the first selected semantic concept of the category; and
storing the annotated digital text.

2. The system of claim 1, wherein converting the category into the embedded category comprises, for each semantic concept in the collection of semantic concepts of the category, generating a word vector for each word or sub-word and a vector array for each phrase in the collection of semantically related words, sub-words, or phrases of the semantic concept and aggregating the word vectors and arrays generated for the semantic concept to generate a concept matrix for the semantic concept, wherein the embedded category comprises a plurality of concept matrices.

3. The system of claim 1, wherein converting the digital text into the plurality of embedded text segments using the embedding, comprises:
embedding the digital text using the embedding to convert each word or sub-word in the digital text into a corresponding vector to generate a plurality of word vectors; and
after embedding the digital text, aggregating subsets of word vectors from the plurality of word vectors to generate a plurality of embedded text matrices, each of the plurality of embedded text matrices representing a different segment of the digital text.

4. The system of claim 1, wherein converting the digital text into the plurality of embedded text segments using the embedding, comprises:
for each of a plurality of segments selected from the digital text, converting each of a plurality of words or sub-words into a corresponding vector to generate a plurality of word vectors and aggregating the plurality of word vectors into an embedded text matrix representing that segment.

5. The system of claim 4, wherein the plurality of segments is determined by applying a sliding window to the digital text.

6. The system of claim 1, wherein determining the relatedness score for each of the plurality of embedded text segments with respect to each of the plurality of embedded semantic concepts to determine the plurality of relatedness scores comprises:
projecting an embedded text matrix onto a concept matrix representing a semantic concept.

7. The system of claim 6, wherein projecting the embedded text matrix on the concept matrix comprises:
combining the embedded text matrix with the concept matrix to determine a universe;
multiplying the universe by the embedded text matrix to determine a first additional matrix;
multiplying the universe by the concept matrix to determine a second additional matrix;
converting the first additional matrix to a first vector and the second additional matrix to a second vector; and
determining a degree of relatedness of the embedded text matrix to the concept matrix by using a vector distance metric to reduce the first vector and the second vector to a number representing the degree of relatedness.

8. The system of claim 1, wherein the relatedness score for each of the plurality of embedded text segments is determined using a DynaMax-Jaccard similarity metric.

9. The system of claim 1, wherein the memory further stores a second category, the second category comprising a second collection of semantic concepts, the second collection of semantic concepts comprising a third semantic concept and a fourth semantic concept, the third semantic concept comprising a third collection of semantically related words, sub-words, or phrases, and the fourth semantic concept comprising a fourth collection of semantically related words, sub-words, or phrases, wherein the third collection of semantically related words is semantically unrelated to the fourth collection of semantically related words.

10. A method of semantically classifying electronic text, the method comprising:
storing a category in a computer memory, the category comprising a collection of semantic concepts, the collection of semantic concepts comprising a first semantic concept and a second semantic concept, each semantic concept in the collection of semantic concepts having an associated label and comprising a collection of semantically related words, sub-words, or phrases;
receiving, by a processor, a digital text to be evaluated against the category;
converting, by the processor, the digital text into a plurality of embedded text segments using an embedding;
converting, by the processor, the category into an embedded category comprising a plurality of embedded semantic concepts, said converting the category into the embedded category comprising embedding the collection of semantic concepts using the embedding;
determining, by the processor, a relatedness score for each of the plurality of embedded text segments with respect to each of the plurality of embedded semantic concepts to determine a plurality of relatedness scores;
determining, by the processor, that the digital text is related to the category based on the plurality of relatedness scores, the determining comprising comparing each relatedness score of the plurality of relatedness scores to a relatedness threshold for the collection of semantic concepts;
selecting a first semantic concept from the collection of semantic concepts for annotation based on the relatedness score corresponding to the first semantic concept satisfying the relatedness threshold;
based on a determination that the digital text is related to the category, annotating, by the processor, the digital text with the label of the first semantic concept of the category; and
storing, by the processor, the annotated digital text.

11. The method of claim 10, wherein converting the category into the embedded category comprises, for each semantic concept in the collection of semantic concepts of the category, generating a word vector for each word or sub-word and a vector array for each phrase in the collection of semantically related words, sub-words, or phrases of the semantic concept and aggregating the word vectors and arrays generated for the semantic concept to generate a concept matrix for the semantic concept, wherein the embedded category comprises a plurality of concept matrices.

12. The method of claim 10, wherein converting the digital text into the plurality of embedded text segments using the embedding, comprises:
- embedding the digital text using the embedding to convert each word or sub-word in the digital text into a corresponding vector to generate a plurality of word vectors; and
- after embedding the digital text, aggregating subsets of word vectors from the plurality of word vectors to generate a plurality of embedded text matrices, each of the plurality of embedded text matrices representing a different segment of the digital text.

13. The method of claim 10, wherein converting the digital text into the plurality of embedded text segments using the embedding, comprises:
- for each of a plurality of segments selected from the digital text, converting each of a plurality of words or sub-words into a corresponding vector to generate a plurality of word vectors and aggregating the plurality of word vectors into an embedded text matrix representing that segment.

14. The method of claim 13, wherein the plurality of segments is determined by applying a sliding window to the digital text.

15. The method of claim 10, wherein determining the relatedness score for each of the plurality of embedded text segments with respect to each of the plurality of embedded semantic concepts to determine the plurality of relatedness scores comprises:
- projecting an embedded text matrix onto a concept matrix representing a semantic concept.

16. The method of claim 15, wherein projecting the embedded text matrix on the concept matrix comprises:
- combining the embedded text matrix with the concept matrix to determine a universe;
- multiplying the universe by the embedded text matrix to determine a first additional matrix;
- multiplying the universe by the concept matrix to determine a second additional matrix;
- converting the first additional matrix to a first vector and the second additional matrix to a second vector;
- determining a degree of relatedness of the embedded text matrix to the concept matrix by using a vector distance metric to reduce the first vector and the second vector to a number representing the degree of relatedness.

17. A computer program product comprising a non-transitory, computer-readable medium storing a set of computer-executable instructions, the set of computer-executable instructions comprising instructions for:
- storing a category comprising a collection of semantic concepts, the collection of semantic concepts comprising a first semantic concept and a second semantic concept, each semantic concept in the collection of semantic concepts having an associated label and comprising a collection of semantically related words, sub-words, or phrases;
- receiving a digital text to be evaluated against the category;
- converting the digital text into a plurality of embedded text segments using an embedding;
- converting the category into an embedded category comprising a plurality of embedded semantic concepts, said converting the category into the embedded category comprising embedding the collection of semantic concepts using the embedding;
- determining a relatedness score for each of the plurality of embedded text segments with respect to each of the plurality of embedded semantic concepts to determine a plurality of relatedness scores;
- determining that the digital text is related to the category based on the plurality of relatedness scores, the determining comprising comparing each relatedness score of the plurality of relatedness scores to a relatedness threshold for the collection of semantic concepts;
- selecting a semantic concept for annotation based on the relatedness score corresponding to the first semantic concept satisfying the relatedness threshold;
- based on a determination that the digital text is related to the category, annotating the digital text with the label of the selected semantic concept of the category; and
- storing the annotated digital text.

18. The computer program product of claim 17, wherein converting the category into the embedded category comprises, for each semantic concept in the collection of semantic concepts of the category, generating a word vector for each word or sub-word and a vector array for each phrase in the collection of semantically related words, sub-words, or phrases of the semantic concept and aggregating the word vectors and arrays generated for the semantic concept to generate a concept matrix for the semantic concept, wherein the embedded category comprises a plurality of concept matrices.

19. The computer program product of claim 17, wherein converting the digital text into the plurality of embedded text segments using the embedding, comprises:
- embedding the digital text using the embedding to convert each word or sub-word in the digital text into a corresponding vector to generate a plurality of word vectors;
- after embedding the digital text, aggregating subsets of word vectors from the plurality of word vectors to generate a plurality of embedded text matrices, each of the plurality of embedded text matrices representing a different segment of the digital text.

20. The computer program product of claim 17, wherein converting the digital text into the plurality of embedded text segments using the embedding, comprises:
- for each of a plurality of segments selected from the digital text, converting each of a plurality of words or sub-words into a corresponding vector to generate a plurality of word vectors and aggregating the plurality of word vectors into an embedded text matrix representing that segment.

21. The computer program product of claim 20, wherein the plurality of segments is determined by applying a sliding window to the digital text.

22. The computer program product of claim 17, wherein determining the relatedness score for each of the plurality of embedded text segments with respect to each of the plurality of embedded semantic concepts to determine the plurality of relatedness scores comprises:
- projecting an embedded text matrix onto a concept matrix representing a semantic concept.

23. The computer program product of claim 22, wherein projecting the embedded text matrix on the concept matrix comprises:
- combining the embedded text matrix with the concept matrix to determine a universe;
- multiplying the universe by the embedded text matrix to determine a first additional matrix;
- multiplying the universe by the concept matrix to determine a second additional matrix;
- converting the first additional matrix to a first vector and the second additional matrix to a second vector;

determining a degree of relatedness of the embedded text matrix to the concept matrix by using a vector distance metric to reduce the first vector and the second vector to a number representing the degree of relatedness.

* * * * *